United States Patent [19]
Capps

[11] Patent Number: 5,523,775
[45] Date of Patent: Jun. 4, 1996

[54] METHOD FOR SELECTING OBJECTS ON A COMPUTER DISPLAY

[75] Inventor: Stephen P. Capps, San Carlos, Calif.

[73] Assignee: Apple Computer, Inc., Cupertino, Calif.

[21] Appl. No.: 225,579

[22] Filed: Jun. 8, 1994

Related U.S. Application Data

[63] Continuation of Ser. No. 888,741, May 26, 1992, abandoned.

[51] Int. Cl.$^6$ .................................................. G09G 5/00
[52] U.S. Cl. ........................ 345/179; 345/173; 345/112; 178/18
[58] Field of Search ..................... 345/112, 156, 345/157, 163, 168, 121, 116, 173, 179, 180, 182; 17/18, 19; 395/143

[56] References Cited

U.S. PATENT DOCUMENTS

| | | | |
|---|---|---|---|
| 4,633,436 | 12/1986 | Flurry | 345/179 |
| 4,739,317 | 4/1988 | Berry et al. | 340/706 |
| 4,812,832 | 3/1989 | Oishi et al. | 340/706 |
| 4,821,030 | 4/1989 | Batson et al. | 340/712 |
| 4,992,630 | 2/1991 | Mletzko | 340/711 |
| 5,009,277 | 4/1991 | Sindebard et al. | 178/18 |
| 5,096,423 | 3/1992 | Goldwasser | 434/118 |
| 5,121,442 | 6/1992 | Togawa et al. | 340/709 |
| 5,157,737 | 10/1992 | Sklarew | 178/18 |
| 5,218,645 | 7/1993 | Bacus | 382/2 |
| 5,220,649 | 6/1993 | Forcier | 395/148 |
| 5,252,951 | 10/1993 | Tannenbaum et al. | 345/156 |
| 5,347,295 | 9/1994 | Agulnick et al. | 345/179 |

FOREIGN PATENT DOCUMENTS 0383304  8/1990  European Pat. Off. .

OTHER PUBLICATIONS

O'Connor, Rory J., "Apple Banking on Newton's Brain," San Jose Mercury News, Apr. 22, 1992.

Macintosch User's Guids, Apple Computer, Inc., 1991, pp. 47–50. Describes highlighting text w/cursor controlled by a mouse and entering changes with a keyboard.

"Microsoft Windows User's Guide "for the Windows Graphical Environment Version 3.0. by Microsoft Corporation 1985–1990.

*Primary Examiner*—Richard Hjerpe
*Assistant Examiner*—Lun-Yi Lao
*Attorney, Agent, or Firm*—Hickman Beyer & Weaver

[57] ABSTRACT

A method for selecting objects displayed on a screen of a pen-based computer system characterized by the steps of: (a) determining that a selection gesture has been made on the screen of the pen-based computer by a stylus; (b) detecting a path made by the stylus across at least a portion of an object depicted on the screen; (c) displaying a line image on the screen along the path; (d) determining a selection of at least a portion of the object as indicated by the path; and (e) displaying selection indicia on the screen representing the selection. The step of displaying the selection indicia can occur concurrently with or after the complete path is made by the stylus on the object. Preferably, the line image is removed after the step of displaying the selection indicia.

15 Claims, 23 Drawing Sheets

≈ 85%

≈ 20%

≈ 0%

≈ 100%

≈ 115%

≈ -15%

METHOD FOR SELECTING OBJECTS ON A COMPUTER DISPLAY

This is a continuation, of application Ser. No. 07/888,741 filed May 26, 1992 now abandoned.

BACKGROUND OF THE INVENTION

The present invention relates generally to the selection of images on a computer screen, and more particularly methods for selecting objects on the screen of a pen-based computer system.

A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

With both pen-based computers and ordinary computers, it is often desirable to select part or all of an "object" displayed on a screen. These objects can take various forms such as text objects, graphical objects, numerical objects, tabular objects, etc. For example, when word processing, it is often desirable to be able to select a word, a sentence, or a paragraph for deletion or for a cut-and-paste operation. With a graphical object, part or all of a graphic can be selected for movement, resizing, or reorientation.

This selection process is often referred to as a "highlighting" process because the selected portion of the object is emphasized in some dramatic fashion such as reverse video, a bolder line, or a distinctive background. With both conventional and pen-based computers, the selection step is usually a predecessor to some form of action to be undertaken with the selected material. The selection process of the prior art tends to be quite literal. For example, if a word is to be selected a pointer in a selection mode is carefully moved over the word or words to cause selection. Alternatively, in mouse and other pointer-type systems, a word can be clicked on twice to indicate that the word should be highlighted, three times to indicate that the word sentence should be highlighted, four times to indicate that the paragraph should be highlighted, etc.

While this literal selection process works well in general purpose computer systems using traditional pointing devices such as mice, track balls, etc., it is not very well adapted to the pen-based computer system environment. Since the primary input device of a pen-based system is a stylus, it is difficult or undesirable to be required to accurately point to the portions of an object to be selected.

SUMMARY OF THE INVENTION

It is therefore desirable to provide a selection or "highlighting" process which is particularly well adapted to the pen-based computer environment. The selection process should be able to accurately select a part or all of an object based upon a less-than-precise movement of a stylus across the screen of a pen-based computer.

Briefly, the method of the present invention includes the steps of moving a stylus on a path across at least a portion of an object depicted on the screen of a computer display, creating a line image on the screen along the path, selecting at least a portion of the object as indicated by the path, and creating a visual depiction of the selection on the screen. The line image formed on the screen is made from a string of short line segments. The visual depiction of the selection can occur either concurrently with or after the creation of the line image on the screen. Preferably, the line image on the screen is removed after the visual depiction of the selection is made.

The present invention further includes a method for detecting a user's intention to enter the selection mode. In the context of a pen-based computer system, this intention is manifested in the form of a "gesture" made by the stylus on the screen. A first gesture of the present invention comprises placing the point of a stylus on the screen for longer than a predetermined period of time. This will cause the "ink" produced by the stylus to change from normal ink to a wider, "highlighter" ink. A second gesture in accordance with the present invention comprises a "tap-and-a-half" where the stylus is tapped and then returned to the screen within a short period of time. A third gesture in accordance with the present invention comprises drawing a small circle within a predetermined period of time.

This invention also includes a number of selection modes. For example, a "precise" selection mode will select well defined portions of an object, while an "imprecise" selection mode will select larger portions or an entire object. Selection algorithms for specific object types, such as text objects and graphical objects, and for general object types are also disclosed.

An advantage of the present invention is that objects and portions of objects displayed on the screen of a pen-based computer system can be easily and accurately selected. The three disclosed gestures permit the user of a pen-based computer system to quickly enter into the selection mode, and the various selection modes allow both precise and imprecise selections to be made.

These and other advantages of the present invention will become apparent to those skilled in the art upon a reading of the following specification of the invention and a study of the several figures of the drawing.

DETAILED DESCRIPTION OF THE PREFERRED EMBODIMENTS

Figure 1:
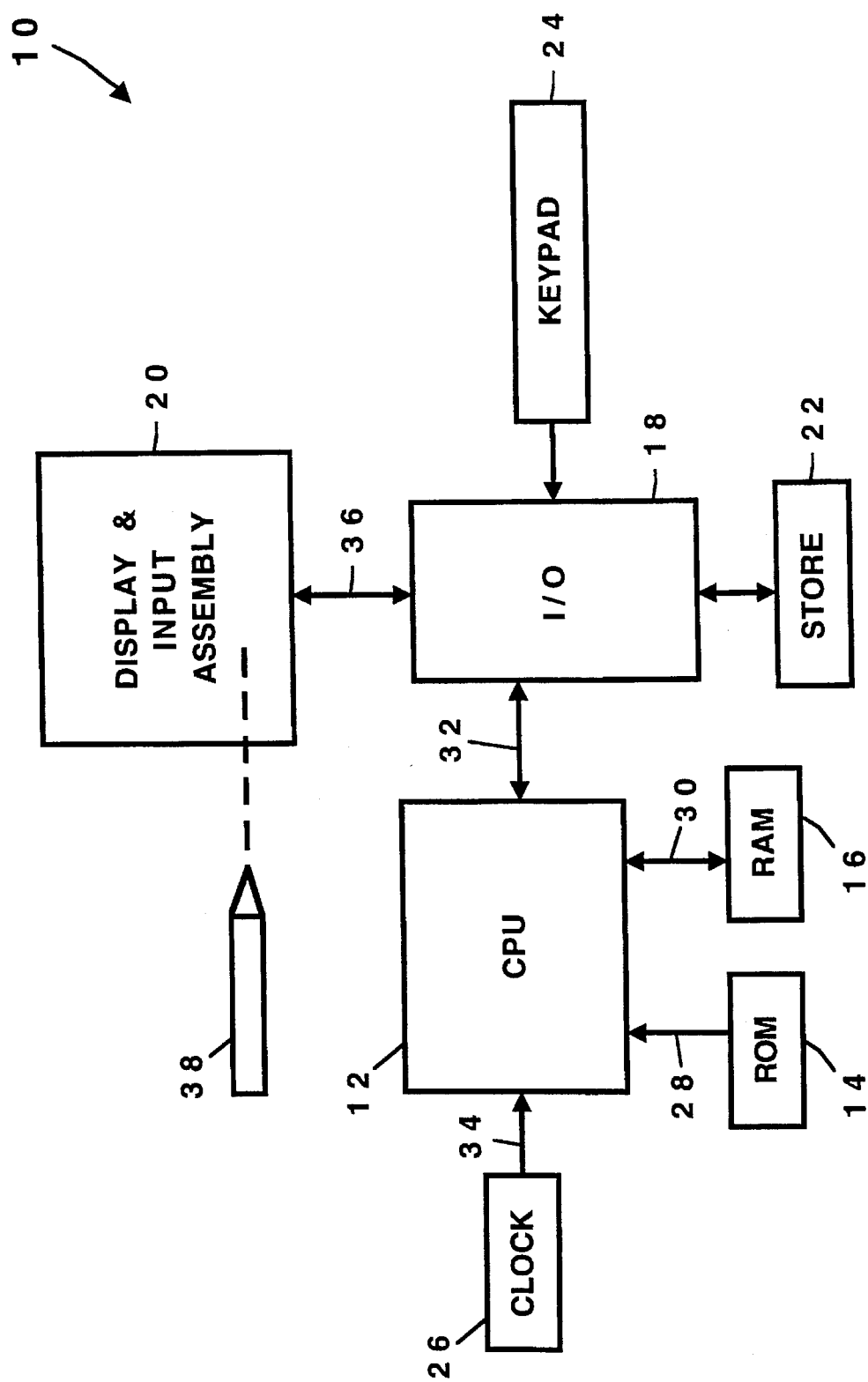
FIG. 1 is a block diagram of a pen-based computer system in accordance with the present invention.

In FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or non-volatile memory such as flash memory, an array of input buttons 23, and a clock 26.

The CPU 12 is preferably a commercially-available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a uni-directional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices, and to the clock 26 by a uni-directional data line 34.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the array of input buttons 23.

Clock 26 provides a series of clock pulses and is typically coupled to an interrupt port of CPU 12 by the data line 34. The clock pulses are used to time various functions and events relating to the computer system 10. The clock 26 can be eliminated and the clock function replaced by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position-sensitive membranes are also readily available on the commercial market. Combination display assemblies such as display assembly 20 which include both the LCD and the input membrane are commercially available from such vendors as Scriptel Corporation of Columbus, Ohio.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In that case, the RAM 16 could be provided with a back-up battery to prevent the loss of data even when the pen-based computer system 10 is turned off. However, it is generally desirable to have some type of long term storage 22 such as a commercially available miniature hard disk drive, or non-volatile memory such as flash memory or battery-backed RAM.

In operation, information is input into the pen-based computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. X & Y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

The aforementioned process produces the illusion that the stylus 38 has an "ink" which appears on the screen of the display assembly 20. Therefore, as used herein, the terms "inking" and "ink" will refer to the process and the result, respectively, of displaying a line or other indicia on the screen of display assembly 20 in response to the movement of stylus 38 on the screen.

Figure 2:
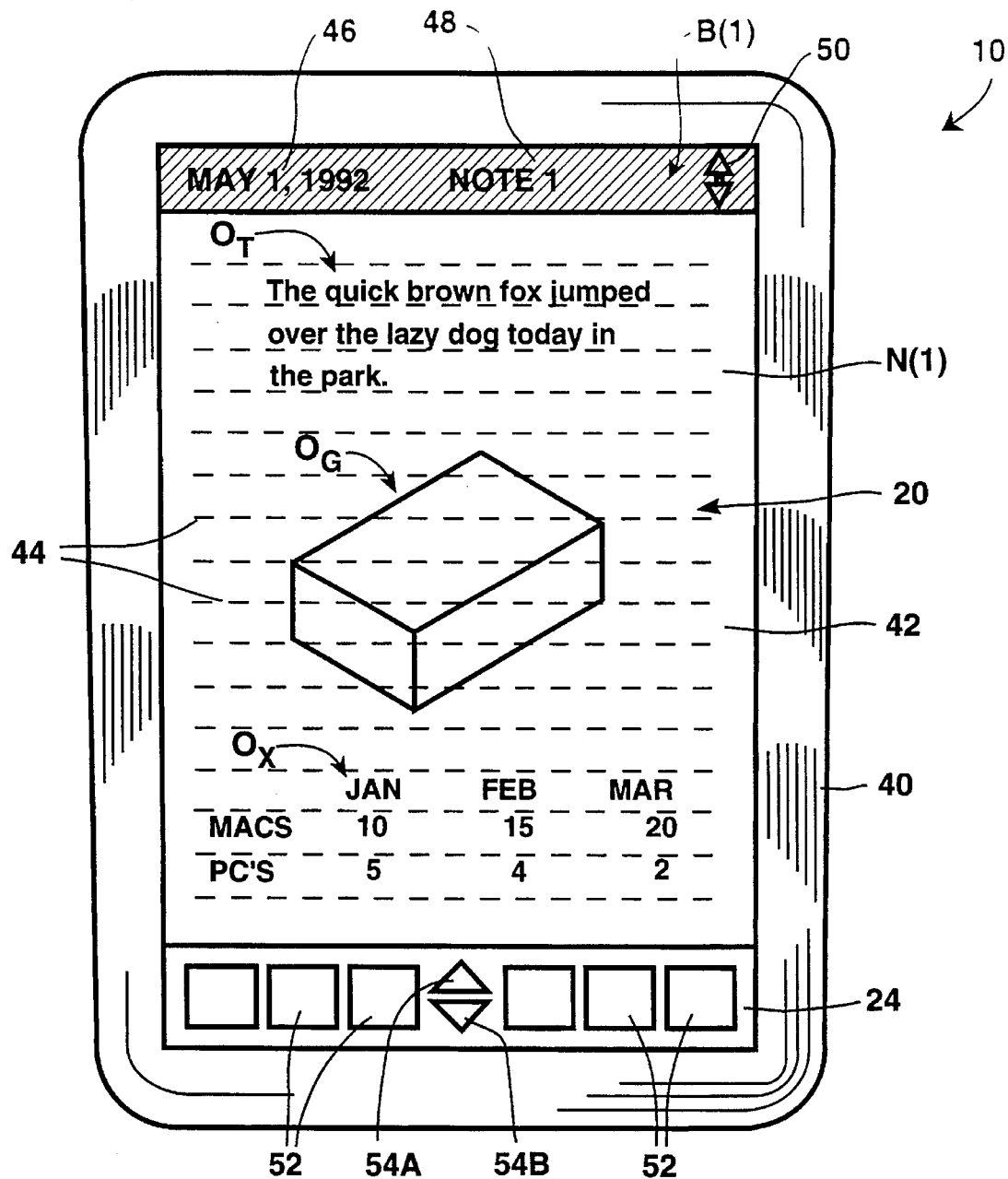
FIG. 2 is a pictorial representation of the screen of a computer display assembly of the present invention where a text, graphical, and a general objects has been entered.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen-based computer system 10 displays on screen 42 an initial note area N(1) including a header bar B(1) and a number of guidelines 44. The header bar B(1) preferably includes the date of creation 46 of the note N(1), a note number 48, and a sizing "button" 50. The optional guidelines 44 aid a user in entering text, graphics, and data into the pen-based computer system 10.

In this preferred embodiment, the keypad 24 is not a part of the screen 38 but, rather, is a permanent, hard-wired array of input buttons coupled to the CPU 12 by I/O circuitry 18. Alternatively, the keypad 24 could comprise "soft buttons" generated at a convenient location on the screen 42, in which case a "button" would be activated by touching the stylus to the screen over the image of the button. The keypad 24 preferably includes a number of dedicated function buttons 52 and a pair of scroll buttons 54A and 54B. The operation of the sizing button 50, scroll buttons 54A and 54B, and other aspects of computer system 10 are discussed in greater detail in copending U.S. patent application Ser. No. 07/868, 013, filed Apr. 13, 1992 on behalf of Tchao et al. and entitled "Method for Manipulating Notes on a Computer Display", said application being assigned to the assignee of the present application and the disclosure of which is hereby incorporated by reference in its entirety.

As is well known to software programmers, an "object" is a logical software unit comprising data and processes which give it capabilities and attributes. For example, an object can be queried as to its type and can return such data as the number of words that it contains. Objects can contain other objects of the same or of a different type. Objects can also be used to project images on a screen according to their object type. There are many well-known texts which describe object-oriented programming. See, for example, *Object-Oriented Programming for the Macintosh*, by Kurt J. Schmucher, Hayden Book Company, 1986.

FIG. 2 illustrates three objects: a text object $O_T$, a graphical object $O_G$, and a general object $O_X$. As will be discussed subsequently, all objects can be treated as a general object $O_X$, or they may be treated more effectively as special objects such as a text or graphical object.

Figure 3:
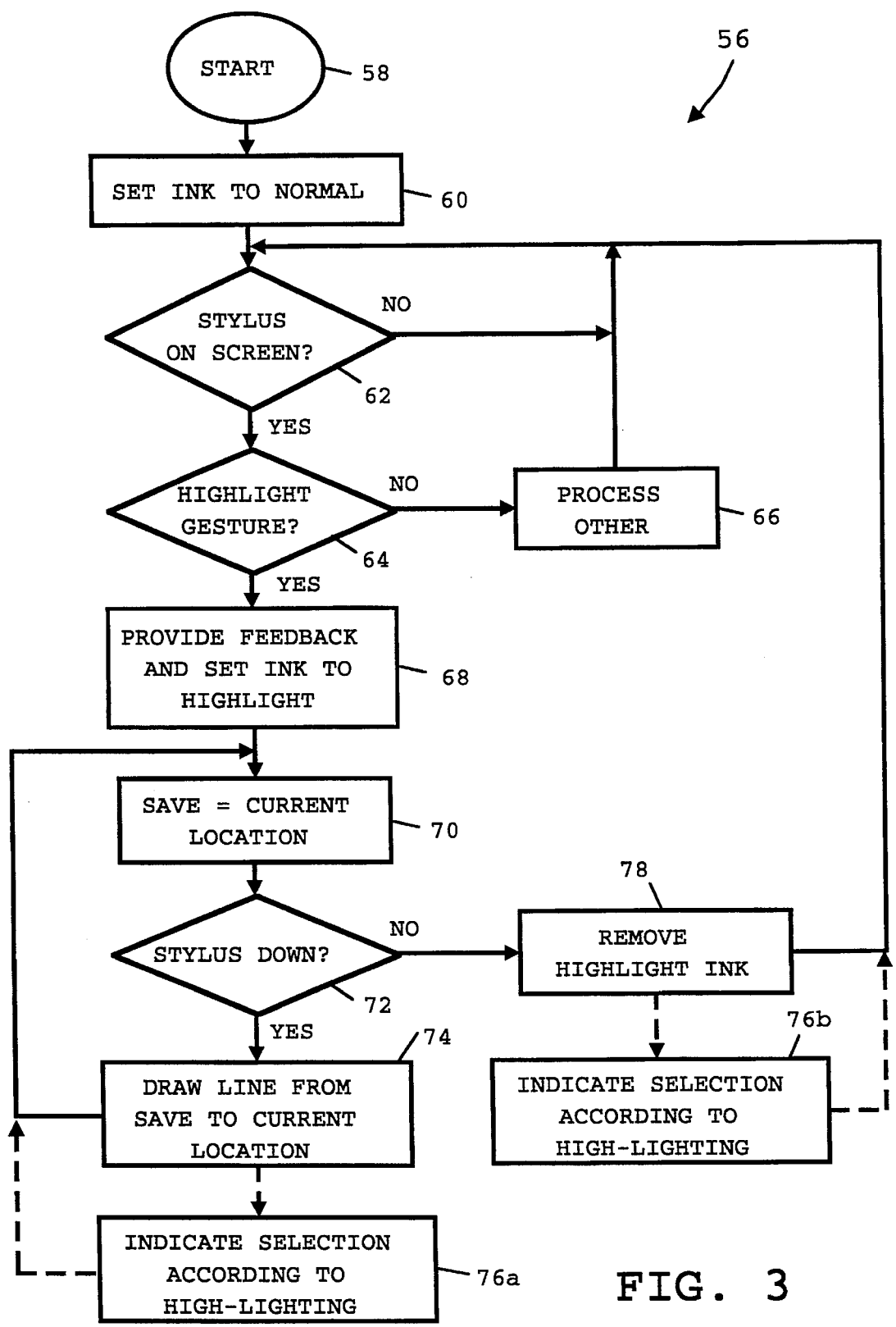
FIG. 3 is a flow diagram of a method for selecting objects on a computer display in accordance with the present invention.
Figure 3A:
FIGS. 3a, 3b, and 3c illustrate three different "nibs" used to produce "ink" on a computer display.
Figure 3B:
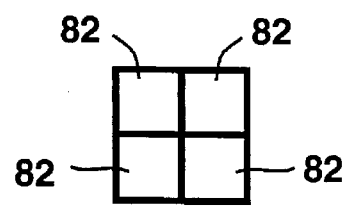

A method 56 for selecting objects on a computer display in accordance with the present invention is illustrated in FIG. 3. The method 56 begins at 58 and, in a step 60, sets the "ink" produced by the stylus 38 to normal. By "normal" it is meant that the number of pixels activated on the screen 42 (i.e. the "nib") when the tip of stylus 38 is touched to screen 42 is set to a default value. For example, in FIG. 3a a single pixel "nib" can be activated to produce an "ink" on screen 42 which is one pixel wide. A nib which is 2×2 pixels wide as shown in FIG. 3b which would produce a 2×2 wide ink could also be considered "normal".

Next, in a step 62, the CPU 12 determines whether the stylus 38 is on the screen 42. If not, the CPU continues to wait for the stylus to be placed on the screen. If the stylus 38 is placed on the screen 42, a step 64 asks if a highlight gesture has been made, as will be discussed in greater detail subsequently. If a highlight gesture has not been made, the stylus is performing some other function than selection, in which case the other function is processed in a step 66 and the process returns to step 62 to wait for another incident of the stylus 38 being placed on the screen 42. If a highlighting gesture has been made, step 68 provides the user feedback and sets the ink to "highlight."

Figure 3C:
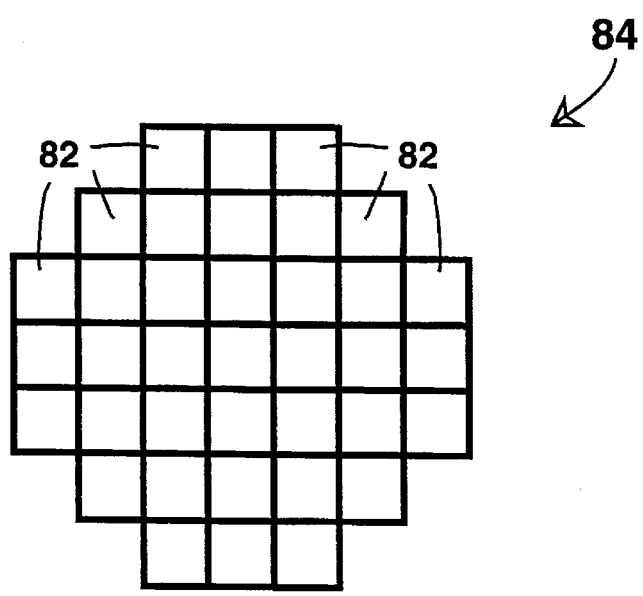

The feedback to the user from step 68 is preferably audible feedback, such as a beep or some other distinctive sound such as the squeaky sound that an actual highlighter makes as it is moved across a piece of paper. The "highlight" ink should be distinctive from the "normal" ink so that users have visible feedback that they are in the selection mode. For example, in FIG. 3c a "round" nib 84 is made from an arrangement of pixels 82 which approximate a circle. This nib 84 will create a wide "highlight" ink capable of making smoother curves that a square nib and which will be clearly distinguishable from the "normal" ink.

In step 70, the current location of the tip of stylus 38 on the screen 42 is stored in a variable SAVE. The current location can be given by pixel row and column, as is well known to those skilled in the art. Next, in a step 72, the inquiry is made whether the stylus is still down, i.e. is the stylus 38 still touching the screen 42. If it is, a line is drawn from the position stored in the variable SAVE to the current location of the stylus 38 on the screen 42 in a step 74. The line corresponds to a segment of the stroke being made with the stylus. Since the nib has been set to highlight, this will cause a distinctive highlight line to be displayed between SAVE and the current location of the stylus.

Processes for drawing lines on a computer screen are well known to those skilled in the art. The step 74 is preferably implemented by graphics software such as QUICKDRAW from Apple Computer, Inc. of Cupertino, Calif. A description of the QUICKDRAW graphics software is found in the book *Inside Macintosh, Volumes I, II, and III*, by C. Rose et al., Addison-Wesley Publishing Company, Inc., July 1988. With such graphics software, a line can be drawn by simply specifying the coordinates of the beginning and the end of the line (i.e. SAVE and the current point), and by specifying the nib.

After step 74 is completed the process will repeat steps 70, 72, and 74 until the stylus 38 is lifted from the screen 42. The loop 70, 72, 74 is typically repeated T times per second to produce a stroke comprising a string of segments, where each segment corresponds to the movement of the stylus in 1/T seconds.

Optionally, a step 76*a* can be inserted into the loop 70, 72, 74 to provide selection of an object according to the segments of the current stroke. This step 76*a* will be discussed in greater detail subsequently.

When the stylus 38 is lifted from the screen 42, the highlight ink corresponding to the completed stroke is removed from the screen 42. Again, this process is easily accomplished with known graphics software such as QUICKDRAW. If optional step 76*a* is a part of the loop 70, 72, 74, then the control of the process can be returned to step 62. Otherwise, step 76*b*, which is functionally equivalent to step 76*a*, is performed to indicate the selection of part or all of an object according to the completed stroke. In consequence, if step 76*a* is processed, the selection will be displayed dynamically as the stroke is being made, and if step 76*b* is processed the final selection will be displayed after the stroke has been completed. After step 76*b* has been completed the process control is returned to step 62.

Figure 4A:
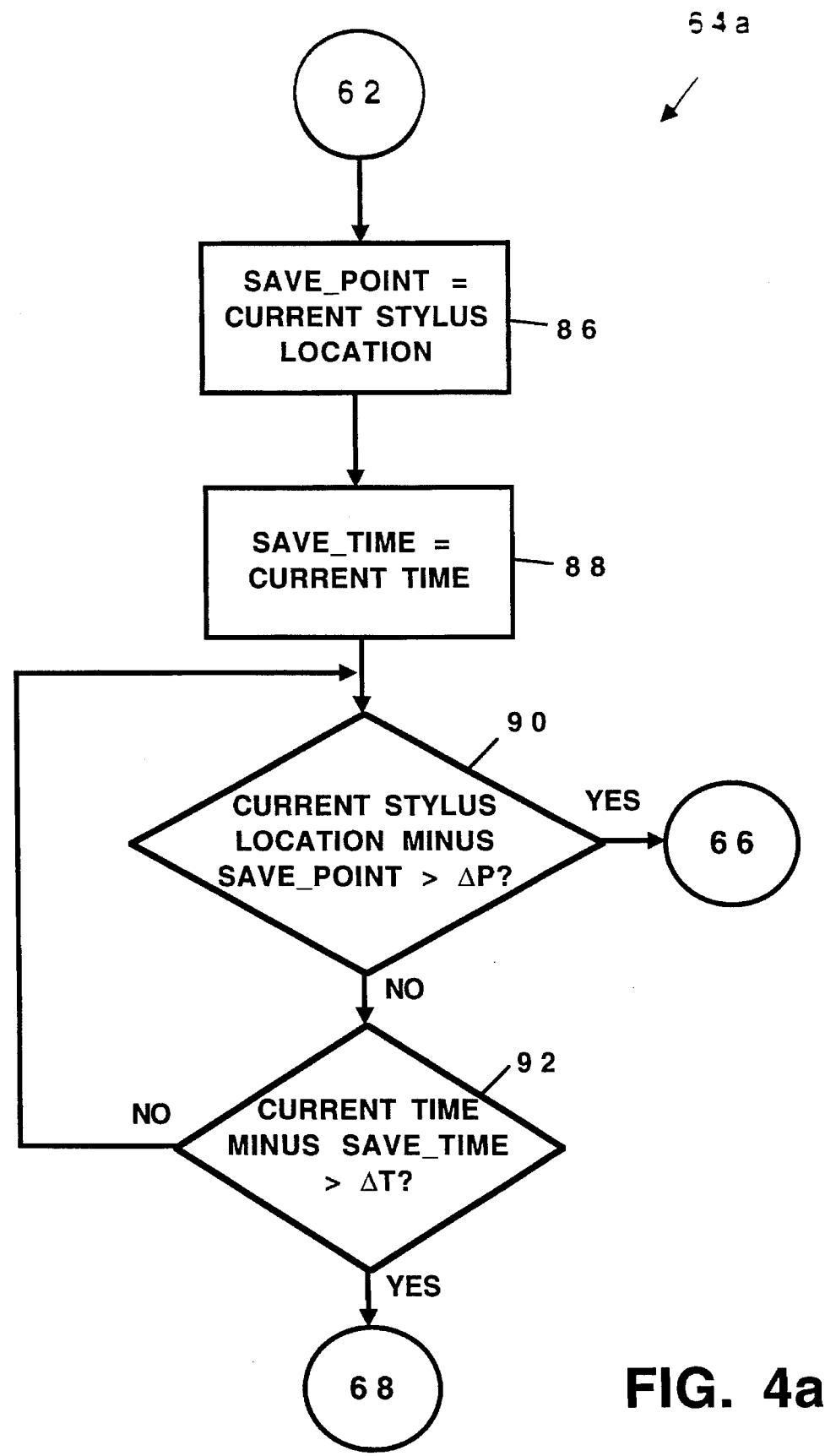
FIG. 4a is a flow diagram of a method for detecting a first highlight gesture.

FIG. 4*a* illustrates a first highlight gesture detection method 64*a* for accomplishing step 64 of FIG. 3. In this instance, the highlight gesture is simply placing the tip of the stylus 38 on the screen 42 and holding it substantially stationary for a predetermined period of time $\Delta T$. During the period of time $\Delta T$, the stylus tip should not move more that a small distance $\Delta P$. A typical value for $\Delta T$ is 0.25 seconds and a typical value for $\Delta P$ is 4 pixels. With the aforementioned Scriptel display assembly, pixels have a pitch of 75 per inch, so $\Delta P$ can be about $4/75^{th}$ of an inch.

In a step 86, the current stylus location on the screen 42 is stored in a variable SAVE_POINT. Similarly, the current time is stored in a variable SAVE_TIME in a step 88. Next in a decision step 90, the difference between the current stylus location and the value of the variable SAVE_POINT is compared with $\Delta P$ and, if the difference is greater than $\Delta P$, control of the process is returned to step 66 of FIG. 3. Otherwise, in step 92 the difference between the current time and the value of the variable SAVE_TIME is compared with $\Delta T$ and, if the difference is greater than $\Delta T$, a highlight gesture has been detected and control of the process is returned to step 68 of FIG. 3. If the difference is less than $\Delta T$, the loop 90, 92 is repeated until there is a "spaceout" (when the stylus moves more than $\Delta P$) or a "timeout" (when the stylus has been in place for more than $\Delta T$).

Figure 4B:
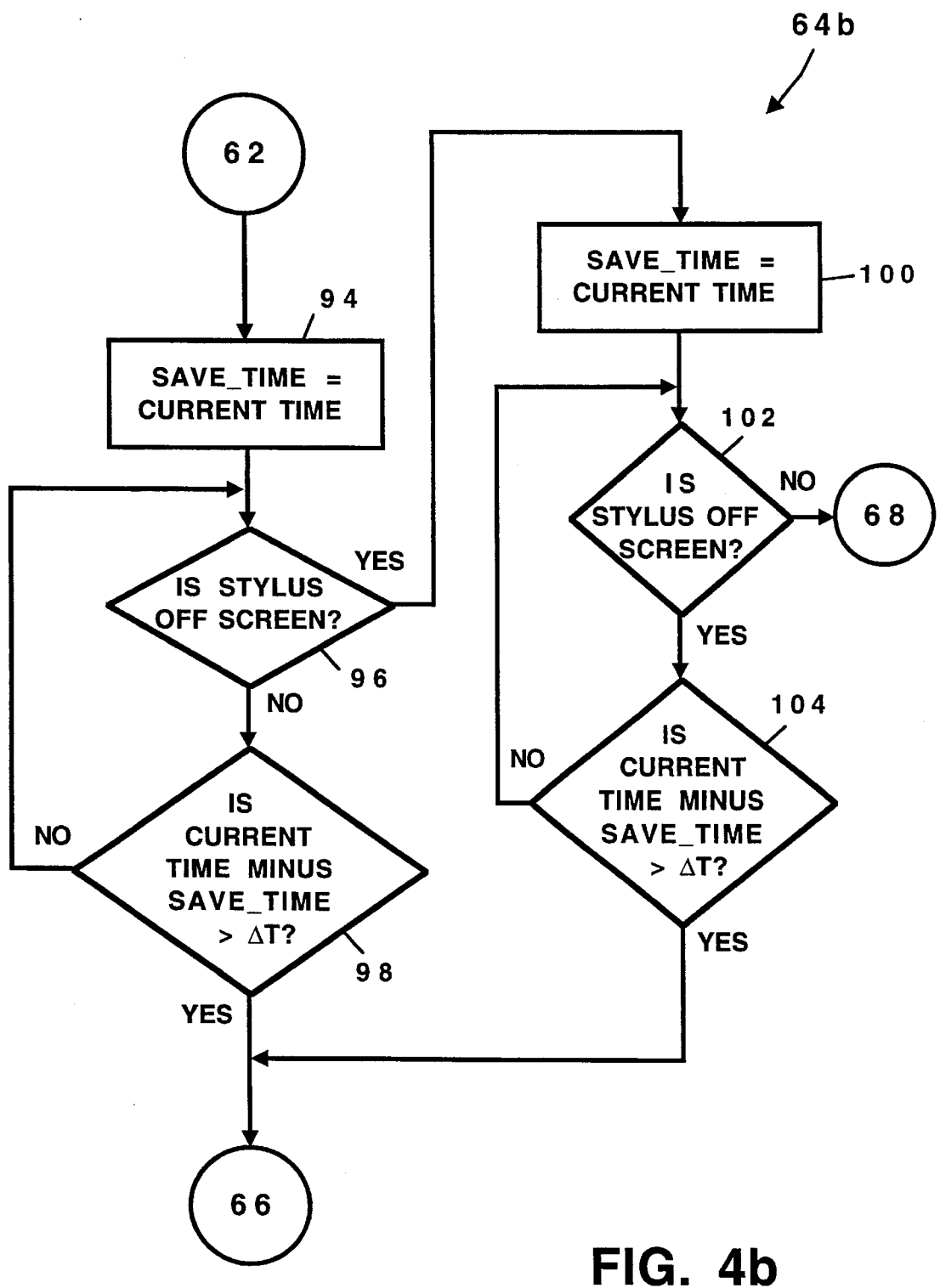
FIG. 4b is a flow diagram of a method for detecting a second highlight gesture.

FIG. 4*b* illustrates a second highlight gesture detection method 64*b* for accomplishing the step 64 of FIG. 3. For this second detection method, the highlight gesture is a tap-and-a-half where the stylus 38 is placed against the screen 42, lifted from the screen, and re-placed upon the screen within the time period $\Delta T$, which is typically about 0.75 seconds.

In a step 94, the current time is saved in the variable SAVE_TIME. The stylus is known to be on the screen 42 from step 62 of FIG. 3. Next, in a decision step 96, it is determined whether the stylus has been subsequently lifted from the screen. If it has not, step 98 determines whether the difference between the current time and the value of SAVE_TIME is greater than $\Delta T$, i.e. whether there is a timeout. If there is a timeout, the process control is returned to step 66 of FIG. 3. If there is not a timeout, the loop 96, 98 is repeated until the stylus is lifted from the screen, as determined by step 96.

After step 96 determines that the stylus has been lifted from the screen in less than $\Delta T$ seconds, a step 100 stores the current time in the variable SAVE_TIME. Next, in a decision step 102, it is again determined whether the stylus is still off of the screen. If it is not, then the tap-and-a-half has been completed in less than $\Delta T$ seconds, a highlight gesture has been detected, and control of the process returns to step 68 of FIG. 3. If the stylus is still off of the screen, a decision step 104 compares the difference between the current time and the value of the variable SAVE_TIME against $\Delta T$. If the difference is less than $\Delta T$ the loop 102, 104 is repeated until either the stylus returns to the screen or until there is a timeout. In the event of a timeout, step 104 returns control of the process to step 66 of FIG. 3.

Figure 4C:
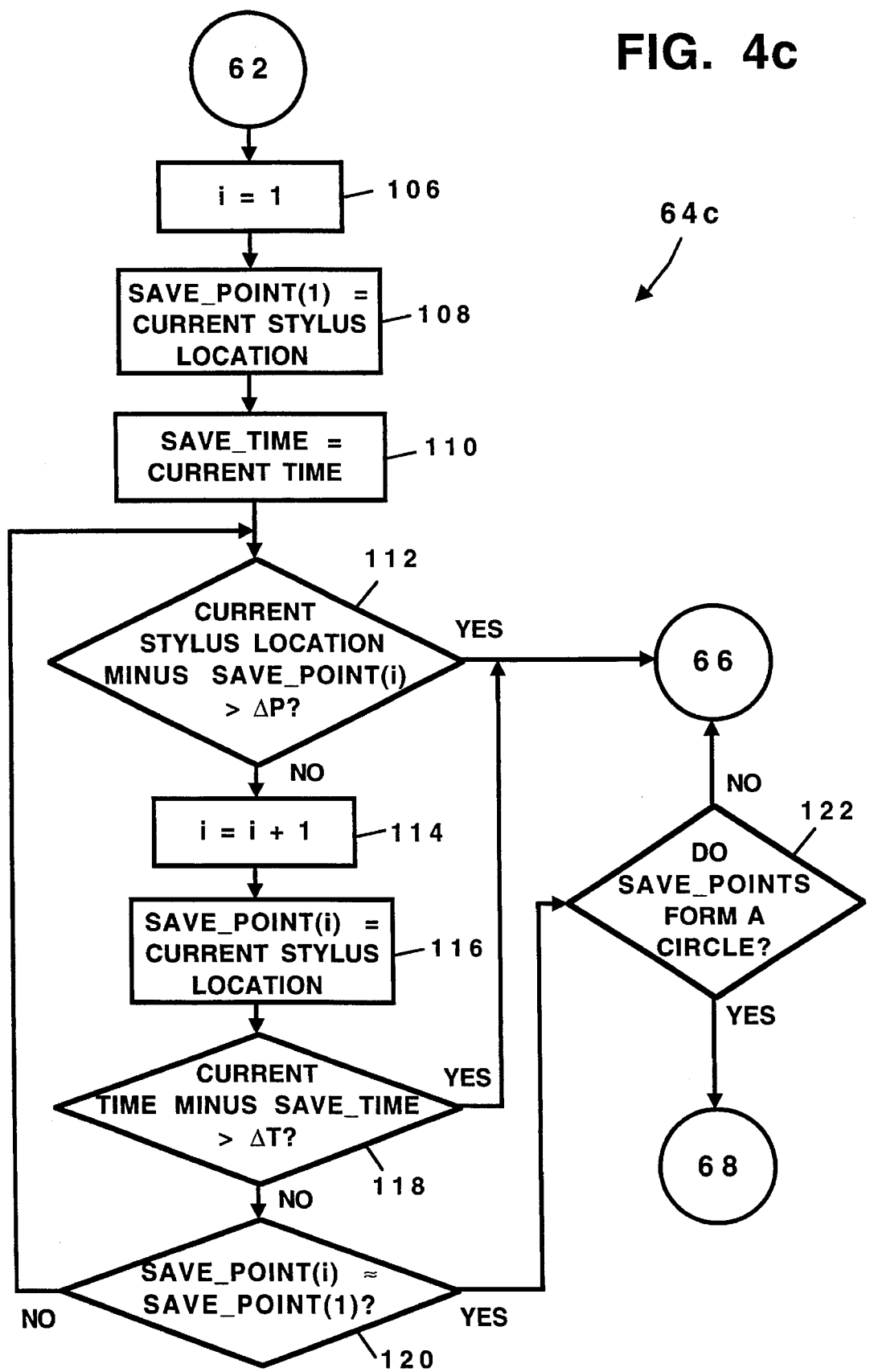
FIG. 4c is a flow diagram of a method for detecting a third highlight gesture.

A third highlight gesture detection method 64*c* for accomplishing the step 64 of FIG. 3 is illustrated in FIG. 4*c*. For this third detection method, a small circle is drawn within a short period of time to indicate to the CPU 12 that the user wishes to enter a selection mode. The gesture should not have consecutive data points which are more than $\Delta P$ apart, the entire gesture should be accomplished within a time period $\Delta T$, and the entire gesture should be roughly circular in shape. Preferably, $\Delta P$ is about 8 pixels and $\Delta T$ is about 1 second.

In a first step 106 of method 64*c*, a counter i is assigned the value 1. An array SAVE_POINT is defined by the system as a place to store an array of datum corresponding to the locations of the tip of stylus 38 on screen 42 at various points in time. Again, this datum typically comprises the Cartesian coordinates of pixels on screen 42 as provided by the display assembly 20. In a step 108, the first position of array SAVE_POINT (i.e. SAVE_POINT(1)) is assigned the value of the current location of the tip of stylus 38 on screen 42. Next, in a step 110, the current time is saved in a variable SAVE_TIME. In a decision step 112, the difference between the current stylus location and the stylus location stored in SAVE_POINT(i) is compared with the distance $\Delta P$. If the difference is greater than $\Delta P$, the gesture being drawn is too big and a spaceout occurs. In this event, process control is returned to step 66 of FIG. 3. If the difference is less than $\Delta P$, the counter i is incremented by 1 in a step 114, and the current stylus location is stored in SAVE_POINT(i) in a step 116. Next, in a step 118, the difference between the current time and SAVE_TIME is compared with $\Delta T$. If the difference is greater than $\Delta T$ the user has taken too long to make the highlight gesture and there is a timeout. In this case, process control is returned to step 66 of FIG. 3. Otherwise, a step 120 compares the SAVE_POINT(i) to SAVE_POINT(1) to see if the gesture (circular or not) has been closed. This is preferably accomplished by taking the difference between SAVE_POINT(i) and SAVE_POINT(1) and comparing this difference with a value $\Delta X$, which is typically about 3 pixels. If the difference is greater than $\Delta X$, i.e. the result of the decision step 120 is "NO", process control is returned to step 112. If the difference between the SAVE_POINT(i) and SAVE_POINT(1) is less than $\Delta X$, i.e. the gesture has been substantially closed, a decision step 122 is performed to determine if the data stored in array SAVE_POINT represent points that at least roughly form a circle. If the points don't form a circle, process control is returned to step 66 of FIG. 3. If the points do at least roughly form a circle, a highlight gesture has been detected and process control is returned to step 68 of FIG. 3.

Figure 4D:
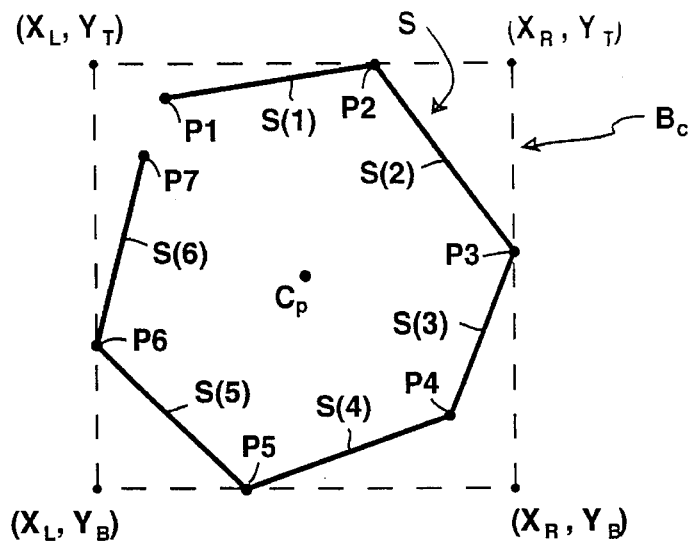
FIG. 4d illustrates a stroke S made on a computer display.

FIG. 4*d* illustrates a stroke S which would qualify as a highlight gesture by the detection method 64*c* of FIG. 4*c*. The stroke S comprises six linear segments S(1)–S(6) stored in an array, and has seven points P1–P7. The datum representing the seven points are stored in an array SAVE_POINT as SAVE_POINT(1)–SAVE_POINT(7). The distance between adjacent points P1–P7, i.e. the segments S(1)–S(6), cannot be greater than ΔP (step 112). The time to make the stroke S starting at point P1 and ending at point P7 cannot take longer than ΔT (step 118). The distance between the first and last point, i.e. the distance between points P1 and P7, cannot be greater than ΔX (step 120). Finally, the points P1–P7 of stroke S must be substantially circular.

A method in accordance with the present invention for determining whether a set of points is substantially circular comprises using a minimal square bounding box Bc to enclose the points P1–P7. The Cartesian coordinates of the points in the array SAVE_POINT are scanned to determine the minimum X coordinate ($X_L$), the maximum X coordinate ($X_R$), the minimum Y coordinate ($Y_B$), and the maximum Y coordinate ($Y_T$). Therefore, the upper left coordinate of bounding box Bc is ($X_L,Y_T$), its upper right coordinate is ($X_R,Y_T$), its lower right coordinate is ($X_R,Y_B$), and its lower left coordinate is ($X_L,Y_T$). From this data it is straightforward to calculate the coordinates of the theoretical centerpoint $C_P$ of stroke S as:

$$C_P=((X_L+X_R)/2,(Y_T+Y_B)/2)$$

The nominal radius Rc is simply $Rc=(X_R-X_L)/2$. To determine whether the points in SAVE_POINT roughly make a circle, each point is compared to an error constant e as follows:

$$|DIST(SAVE\_POINT(i),C_P)-Rc|<e$$

Where DIST is a function which calculates the distance between SAVE_POINT(i) and $C_P$. If any one of SAVE_POINT fails this test, the points P1–P7 are determined not to form a circle.

Typically, e is calculated as a percentage of Rc, e.g. 15% of Rc. Therefore, for this example, all of the points in SAVE_POINT must fall within two circles concentric around $C_P$ and having radii of 0.85×Rc and 1.15×Rc. If it is desirable to recognize more eccentric "circles" e.g. an ellipse or an irregular, closed shape, the error constant e can be increased. For example, if e were 50%, the stroke S would only have to be a substantially closed stroke where no point is less than 50% or more than 150% of Rc from the center point $C_P$.

Figure 5A:
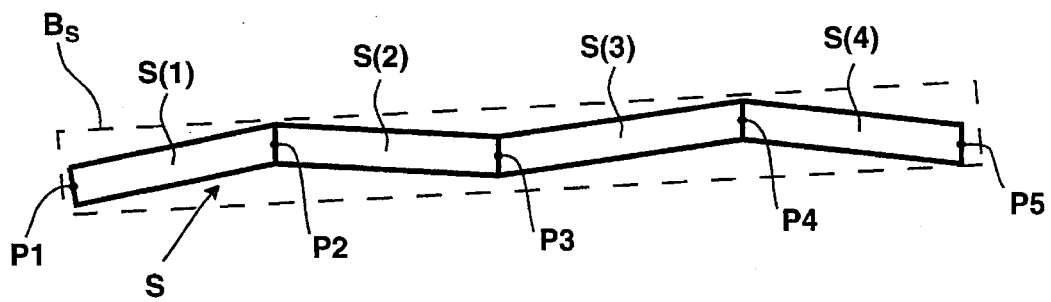
FIG. 5a illustrates a stroke made on a computer display.
Figure 5:
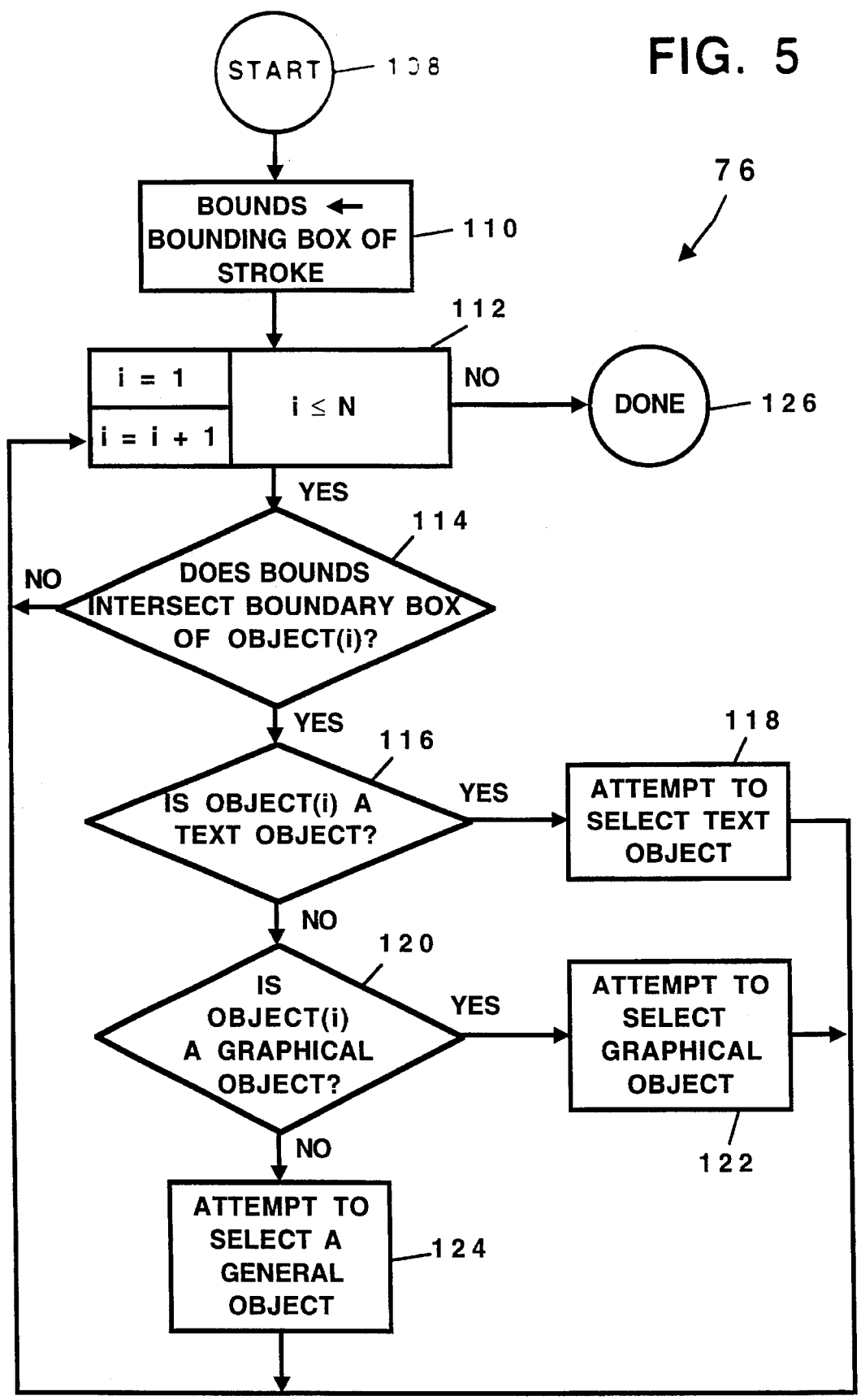
FIG. 5 is a flow diagram illustrating a method for selecting objects according to a stroke made on a computer display in accordance with the present invention.

FIG. 5 illustrates a selection process 76 suitable for steps 76a and 76b of FIG. 3. The process begins at 108, and parameters describing a bounding box of the stroke (either completed or partial) is stored in the variable BOUNDS. With brief reference to FIG. 5a, a stroke S is comprised of a number of linear segments S(1), S(2), etc. having endpoints P1, P2, P3, etc. The entire stroke S defines a bounding box Bs which is the minimum rectilinear box which encloses the stroke S. The coordinates (e.g. the corner points) of this bounding box Bs are stored in the variable BOUNDS.

Next, an iterative loop is defined in step 112, where a counter i ranges from 1 to N, where N is the number of objects on the screen 42 of display assembly 20. In a decision step 114, it is determined whether BOUNDS (the boundary box of stroke S) intersects with a boundary box of the first object on the screen 42 (OBJECT(1)). Each object on the screen has a boundary box which encloses it, just as the boundary box BOUNDS encloses the stroke S. If BOUNDS does not intersect with OBJECT(i), process control is returned to step 112 where i is iterated by one and the next object is compared to BOUNDS to see if there is an intersection between the two. The loop 112, 114 will continue until BOUNDS intersects an object OBJECT(i) or until all objects have been compared to BOUNDS without any intersection between the two.

When step 114 determines that BOUNDS does intersect the boundary box of OBJECT(i), a step 116 determines whether OBJECT(i) is a text object. It is well known in object oriented programming that objects can be tagged with distinctive types, such as text, graphical, etc., so it is a straightforward matter to read the tag for OBJECT(i) to determine whether it is a text object. If it is, then the process attempts to select the text object according to the stroke S in a step 118, and process control returns to step 112. If step 116 determines that OBJECT(i) is not a text object, then step 120 determines whether the object is a graphical object, again by reading the object type tag of OBJECT(i). If it is a graphical object, then the process attempts to select the graphical object according to stroke S in a step 122, and then process control returns, once again, to step 112.

Other types of specified objects can be handled in a similar way as text objects and graphical objects. A general or unspecified object can be handled by a step 124. Again, after the completion of step 124, process control is returned to step 112. After all N objects have been processed, process 76 is completed as indicated at 126.

Figure 6:
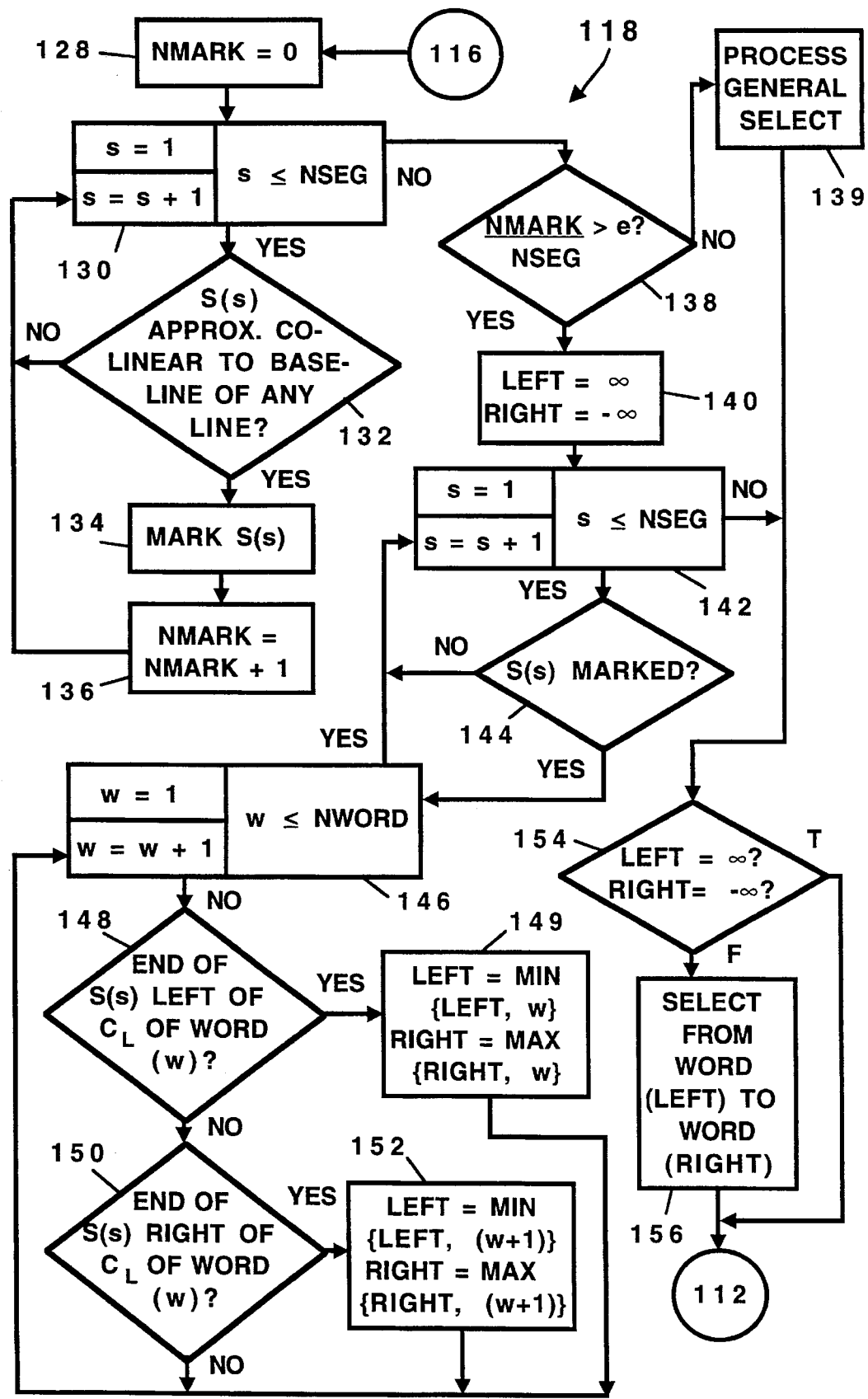
FIG. 6 is a flow diagram illustrating a method for selecting a text object in accordance with the present invention.

FIG. 6 illustrates the process of step 118 of FIG. 5 in greater detail. The process 118 begins with a step 128 which initializes a variable NMARK to zero. NMARK is used to store the number of marked segments S(1), S(2), etc. in a stroke S which meet a predetermined criteria. For example, in FIG. 6a a text object T has a bounding box $B_t$ and a base line L. A stroke S has three linear segments S(1), S(2), and S(3). The stroke S also has a bounding box $B_S$ which intersects the bounding box $B_t$ of object T. Preferably, the words in a text object are numbered consecutively left to right in a line and top to bottom in the text object. For example, if there are five words in a first line and six words in a second line, the words in the first line would be numbered 1, 2, 3, 4, 5 from left to right and the words in the second line would be numbered 6, 7, 8, 9, 10, 11 from left to right. The words in the text object can be thought of as being stored in an array WORD(w), where w ranges from 1 to NWORD, the total number of words in the text object.

Figure 6A:
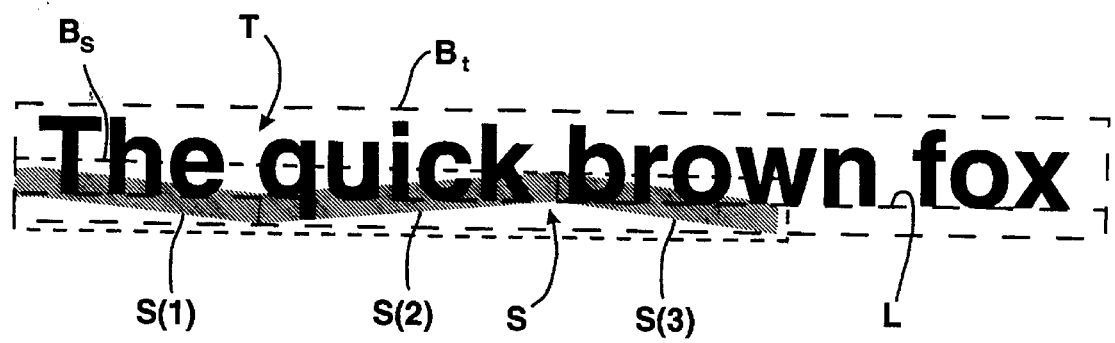
FIGS. 6a and 6b illustrate bounding boxes for a line of text and a word, respectively.

Referring again to FIG. 6, the next step is to set up an iterative loop step 130 such that a counter s is iterated by one in the range of {1::NSEG}, where NSEG is the number of segments in the stroke S. In the example of FIG. 6a, NSEG is three. Next, in a decision step 132, the segment S(i) is compared with the baseline L of text object T. If the segment S(i) is not roughly colinear with baseline L, process control is returned to step 130 and s is iterated by one. By roughly colinear it is meant that the segment S(i) intersects baseline L or is separated from baseline L by only a small amount (e.g. 10 pixels), and that the angle of segment S(i) does not deviate from the angle of baseline L by more than a predetermined amount (e.g. 15 degrees). If segment S(i) is roughly colinear with baseline L, the segment S(i) is marked in a step 134, and the variable NMARK is iterated by one in a step 136. The segment S(i) can be marked by setting a flag in an array or in an object associated with the segment S(i). After step 136 has been completed, process control is returned to step 130.

When all NSEG segments have been processed by the iterative loop step 130, a decision step 138 is performed which compares the ratio of the variable NMARK to the variable NSEG with an error constant e. The purpose of step 138 is to determine the percentage of marked segments to the total number of segments in the stroke S. A typical value for the error variable e is 75%. If the ratio is less than or equal to e, the process control is turned over to a routine 139 for further processing.

If the ratio of the variable NMARK to the variable NSEG is greater than e, there is a high confidence that the stroke S is carefully selecting the text object T. In that instance, the variables LEFT and RIGHT, corresponding to the leftmost and rightmost word to be selected, are set to plus and minus infinity, respectively. In the context of a computer system, this means setting the variables LEFT and RIGHT to arbitrarily large numbers, such as ±32767 ($2^{16}$ including a sign bit). Next, an interative loop 142 is commenced by initializing a counter s to the value one. Counter s is iterated by one in each pass of the loop and ranges in value from 1 to NSEG. In a step 144, it is determined whether segment S(s) is marked. If it is not, process control is returned to step 142 where s is iterated by one. If S(s) is marked, an iterative loop 146 is entered to determine which word in the text object T is marked. The loop 146 ranges from 1 to NWORD, where NWORD is the total number of words in the text object. The number of words in a text object T can be determined by inspecting the parameters of text object T. The words of the text object can be thought of as existing in an array WORD ranging from WORD(1) to WORD(NWORD).

Figure 6B:
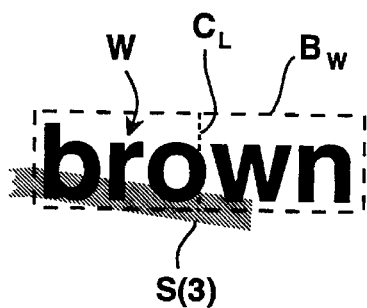

In a decision step 148, it is determined whether the segment S(s) terminates in the left half of the bounding box of WORD(w). Referring briefly to FIG. 6b, a word W has a bounding box $B_w$ having a centerline $C_L$. The end of segment S(3) is past centerline $C_L$, so the result of decision step 148 would be NO in this instance. If the end of segment S(s) is positioned in the left half of WORD(w), the variables LEFT and RIGHT are updated in a step 149 as follows:

LEFT=MIN {LEFT, w}

RIGHT=MAX {RIGHT, w} where MIN and MAX are functions which return the minimum and maximum, respectively, of the values listed within the brackets. If LEFT is still +∞, LEFT will be replaced by the current value of w. If RIGHT is still −∞, RIGHT will also be replaced by w. After the variables LEFT and RIGHT have been updated, process control is returned to step 146.

If the result of the decision step 148 is NO, decision step 150 determines whether the end of segment S(s) is in the right half of the bounding box of WORD(w). If it is not, process control is returned to step 146 for the continuation of the iterative loop. If it is, the variables LEFT and RIGHT are updated in a step 152 as follows:

LEFT=MIN {LEFT, (w+1)}

RIGHT=MAX {RIGHT, (w+1)} where, again, MIN and MAX are functions which return the minimum and maximum, respectively, of the values listed within the brackets. If LEFT is still +∞, LEFT will be replaced by the value of w+1. If RIGHT is still −∞, RIGHT will also be replaced by w+1. After the variables LEFT and RIGHT have been updated, process control is returned to step 146.

The effect of iterative loop 146 is to make a running update for each segment S(s) of the leftmost word number (LEFT) to be selected and the rightmost word number plus one (RIGHT) to be selected. Ultimately, all of the words between LEFT and RIGHT will be selected, inclusive of LEFT and exclusive of RIGHT.

After the completion of iterative loop 146, i.e. after NWORD passes through the loop, process control is returned to iterative loop 142. After completion of iterative loop 142, i.e. after NSEG passes through the loop, decision step 154 examines the variables LEFT and RIGHT to determine whether any word in the text object has been selected. If no word had been selected, then the values of LEFT and RIGHT are still +∞ and −∞, respectively, and process control is returned to step 112 of FIG. 4c without any selection of the text object. If the values of LEFT and RIGHT are not infinite, then at least one word has been selected and step 156 causes a selection of the text object starting inclusively with WORD(LEFT) and ending exclusively with WORD(RIGHT), after which process control is again returned to step 112.

Figure 7:
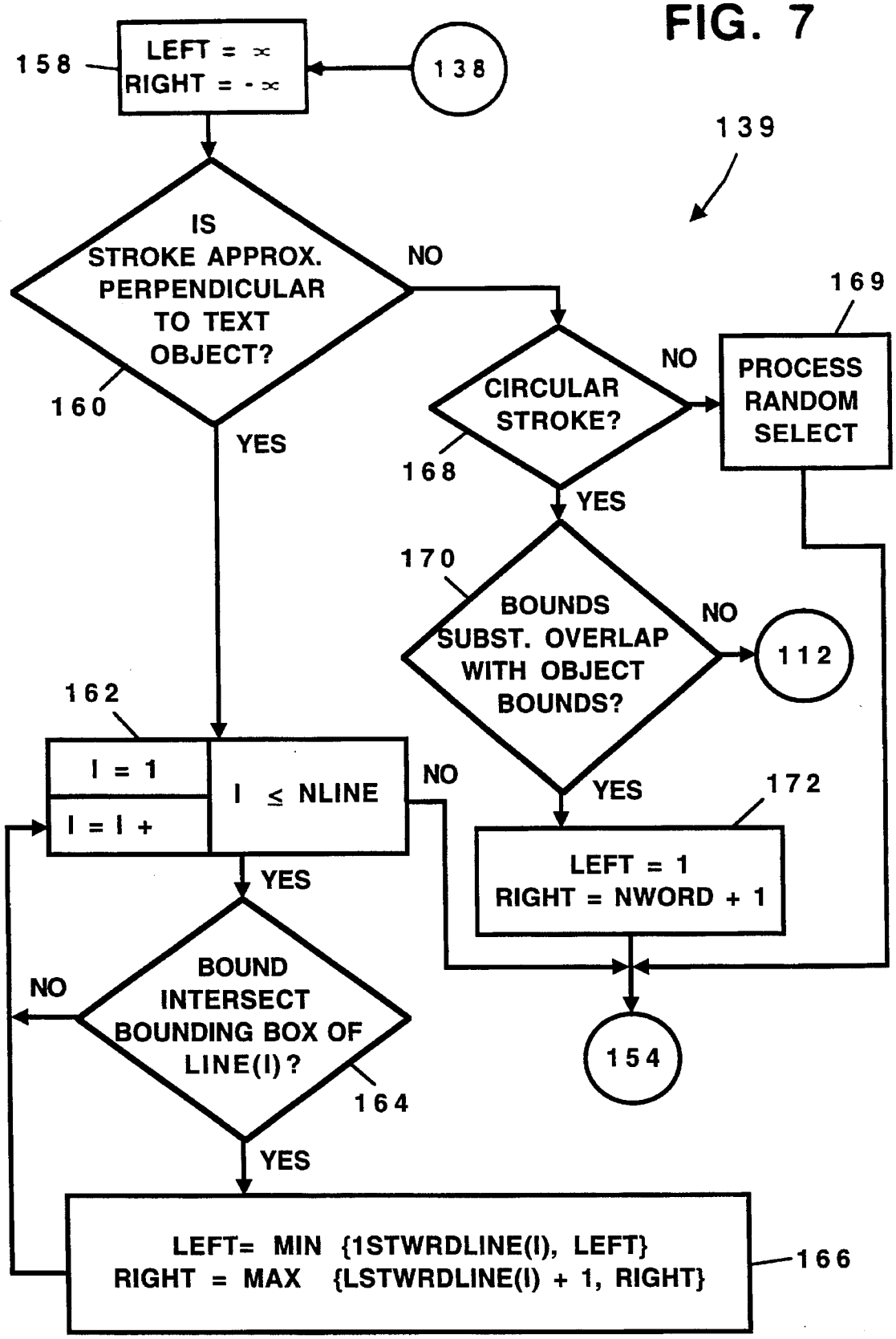
FIG. 7 is a flow diagram illustrating a general text select method in accordance with the present invention.

FIG. 7 illustrates the "Process General Select" step 139 of FIG. 6 in greater detail. Process 139 begins with an initialization of variables LEFT and RIGHT to ±∞, respectively, for the purposes described previously. Next, in a decision step 160, it is determined whether the stroke is approximately perpendicular to the text object. Referring again briefly to FIG. 6a, this is equivalent to asking the question whether the bounding box Bs of stroke S is substantially perpendicular (e.g.,. within 10 degrees of 90 degrees) to the bounding box Bt of the text object T. If it is, a user is determined to be selecting the entire line of text object T.

While the example of FIG. 6a shows a single line text object T, often a text object will have multiple lines of text. If the stroke S is generally perpendicular to the multi-line text object T as a whole, it is desirable to know which of the lines of text should be selected. An iterative loop 162 is therefore commenced having a counter 1 which is iterated by 1 in the range {1::NLINE}, where NLINE is the number of lines in the text object. NLINE is preferably a built-in parameter of the text object being processed. In a decision step 164, the bounding box BOUNDS of the stroke S is compared to a bounding box $B_L$ of the $1^{th}$ line of the text object, i.e. LINE(1). As with the case with text objects and individual words, lines within a text object also have their own bounding boxes. If BOUNDS and bounding box $B_L$ of Line(1) do not intersect, process control is returned to iterative loop 162. If they do intersect, the variables LEFT and RIGHT are updated as follows by step 166:

LEFT=MIN {LEFT, 1STWORDLINE(1)}

RIGHT=MAX {RIGHT,LSTWORDLINE(1)+1} where MIN and MAX are the same functions described previously, 1STWORDLINE(1) is the word number of the first word of LINE(1), and LSTWORDLINE(1) is the word number of the last word of LINE(1). After the variables LEFT and RIGHT are updated, process control is returned to step 162. After the iterative loop step 162 has cycled NLINE times, process control is returned to step 154 of FIG. 6.

If decision step 160 determines that the stroke is not substantially perpendicular to the text object, a decision step 168 determines whether a substantially circular stroke has been made. A method for determining if a stroke is substantially circular has been previously described with reference to FIG. 4d. One possible meaning of a circular stroke over a large portion of a text object is that a user wishes to select the entire text object. If the stroke is not substantially circular, process control is turned over to step 169 for further processing.

If it is determined by decision step 168 that the stroke is substantially circular, a decision step 170 determines whether the boundary box BOUNDS of the circular stroke substantially overlaps the boundary box of the text object as a whole. Substantial overlap can be set at a given percentage overlap, e.g. BOUNDS overlaps 80% of the boundary box of the text object, or if the boundary box of the text object overlaps 80% of BOUNDS. If there is not substantial overlap, process control is returned to step 112 of FIG. 5 without any selection of the text object being made. If there is substantial overlap, step 172 updates the variables LEFT and RIGHT as follows:

LEFT=1

RIGHT=NWORD+1

Process control then returns to step 154 of FIG. 6.

Figure 8:
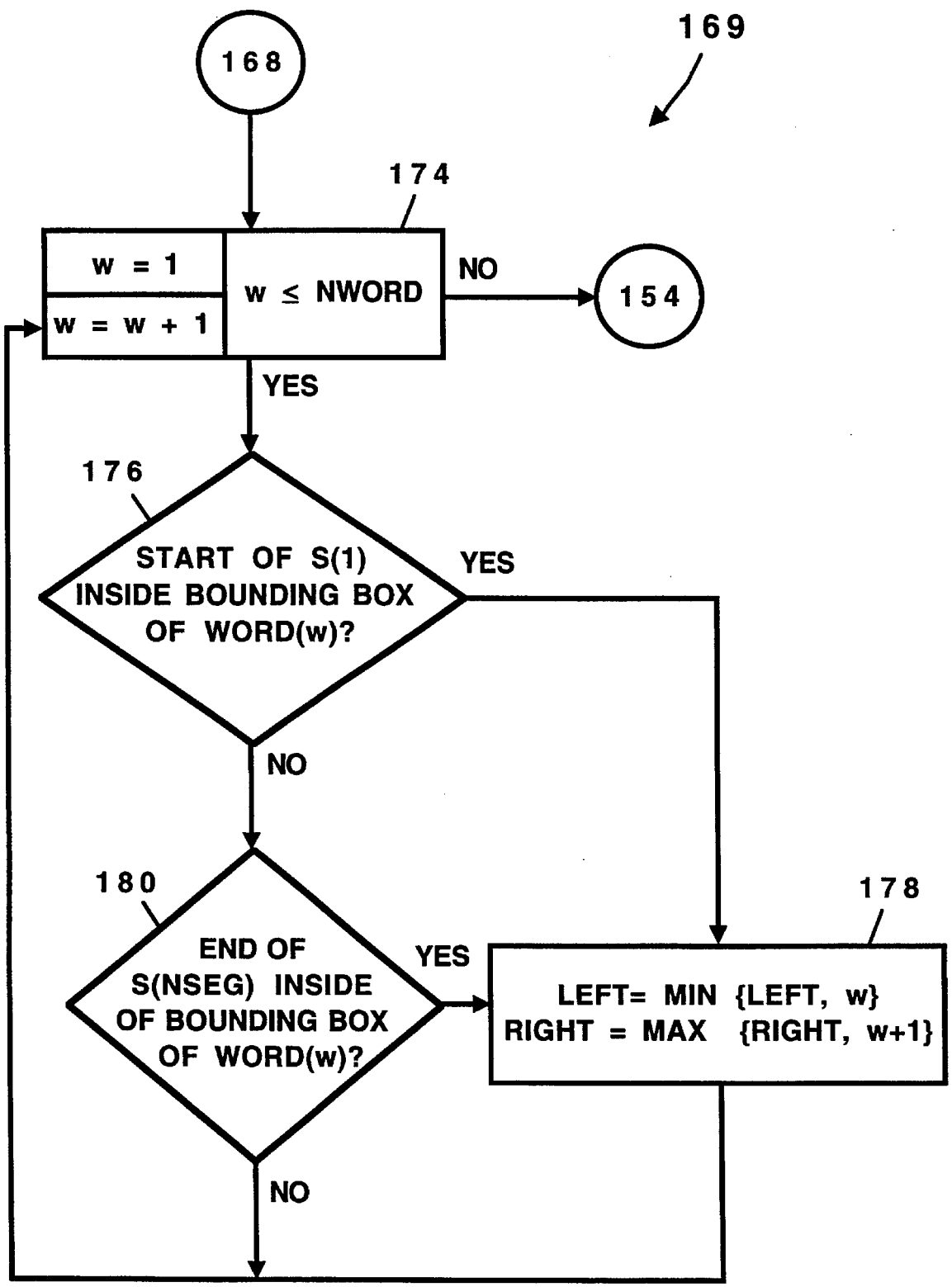
FIG. 8 is a flow diagram illustrating a random text select method in accordance with the present invention.

FIG. 8 illustrates the "Process Random Select" step 169 of FIG. 7. This type of selection will occur if all more precise forms of selection fail. In an iterative loop step 174, a counter w is initialized to 1 and is iterated by 1 in the range {1::NWORD}. In a decision step 176, the starting point of the first segment S(1) of stroke S is compared with the bounding box of WORD(w). If it is inside, the variables LEFT and RIGHT are updated in a step 178 as follows:

LEFT=MIN {LEFT,w}

RIGHT=MAX {RIGHT,w} where the functions MIN and MAX have been described previously. If the result of decision step is in the negative, a decision step 180 determines whether the ending point of the last segment S(NSEG) of stroke S is inside the bounding box of WORD(w). If it is, step 178 is performed to update variables LEFT and RIGHT. If not, process control is returned to iterative loop step 174. At the completion of iterative loop step 174, process control is returned to step 154 of FIG. 6.

The following are a number of examples of text selection in accordance with the process of step 118 of FIG. 5.

EXAMPLE 1

Precise Text Selection Along Baseline

Figure 9A:
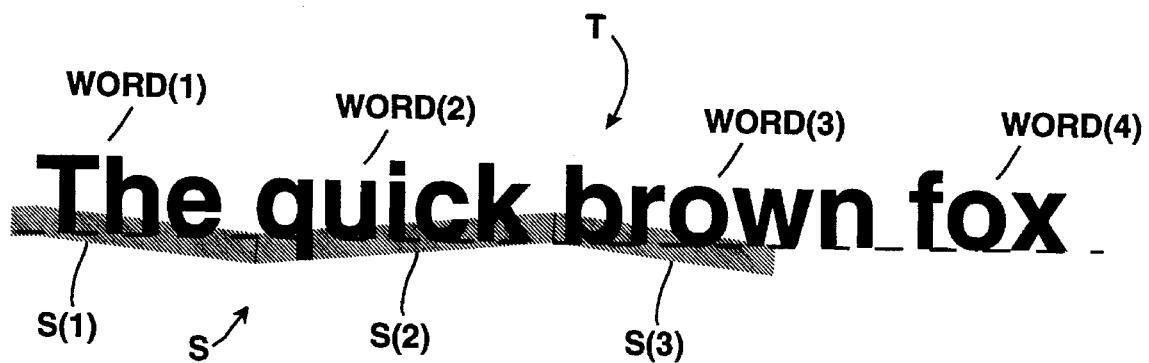
FIGS. 9a and 9b illustrate precise text selection along a baseline.
Figure 9B:

In FIG. 9a, a text object T comprising four words WORD(1), WORD(2), WORD(3), and WORD(4) is partially selected by a stroke S comprising segments S(1), S(2), and S(3). The number of segments NSEG is therefore 3, and all segments are marked by the iterative loop step 130 of FIG. 6. Step 138 is answered in the affirmative since the ratio of NMARK to NSEG is unity. Iterative loop step 146 then sequentially compares the ends of the segments with the centerlines of the words, such that the variable LEFT would have the value of 1 (because segment S(1) has an end in the bounding box of WORD(1)) and the variable RIGHT would have the value of 4 (because segment S(3) has an end in the bounding box of WORD(3) and RIGHT=w+1 from step 152). Since the leftmost word is inclusive and the rightmost word is exclusive, WORD(1)–WORD(3) will be selected. This selection is indicated by the highlight H seen in FIG. 9b.

EXAMPLE 2

Precise Text Selection by Line

Figure 10A:
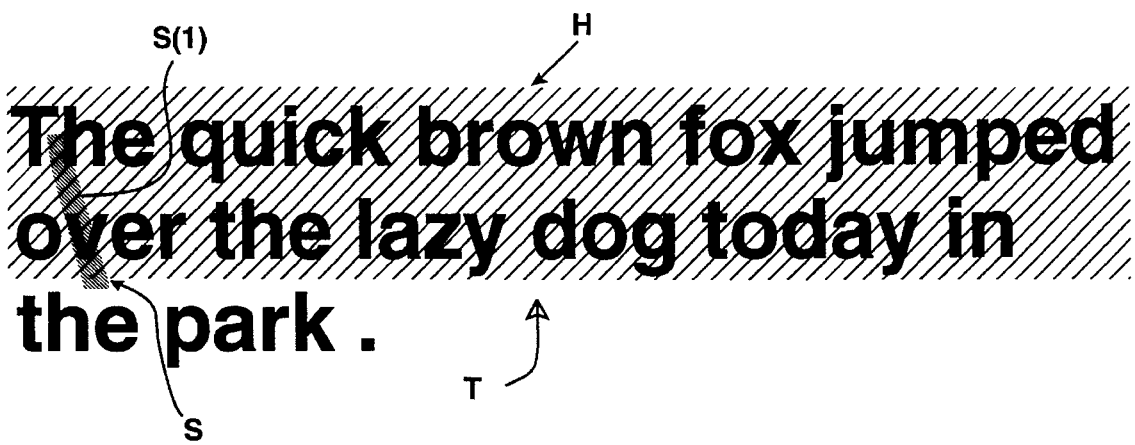
FIGS. 10a and 10b illustrate precise text selection by line.
Figure 10B:
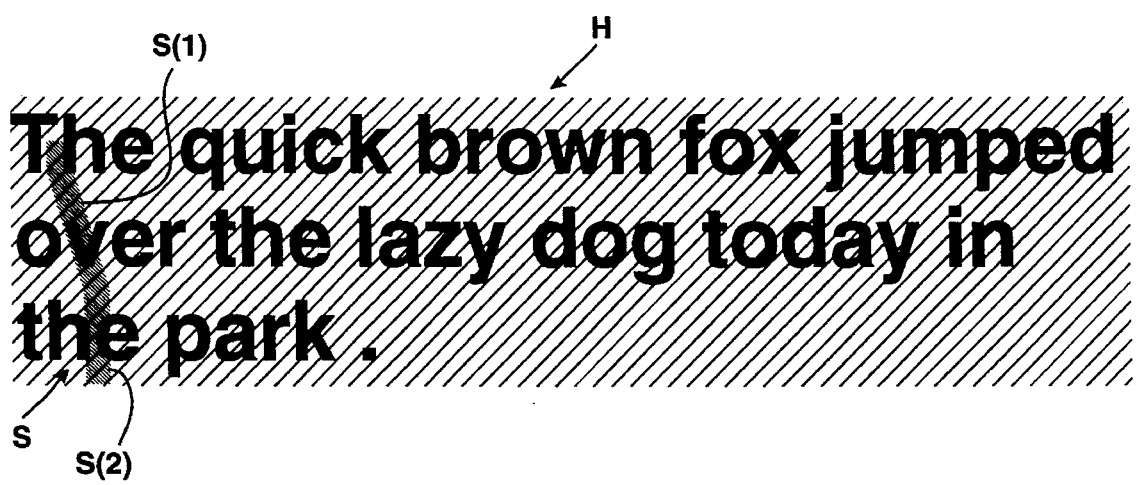

In FIGS. 10a and 10b, a text object T with three lines of text is shown partially and fully selected, respectively, with highlight H. FIG. 10a illustrates a first point in time when only a first segment S(1) of stroke S has been drawn, and FIG. 10b illustrates a slightly later point in time when a second segment S(2) of stroke S has been drawn. Referring to FIG. 6, the iterative loop step 130 does not mark the segment S(1) shown in FIG. 10a nor the additional segment S(2) shown in FIG. 10b. Therefore, the ratio of NMARK to NSEG is zero, and the process general select step 139 is performed. In FIG. 7, the stroke S is determined to be approximately perpendicular to the text object T, and iterative loop step 162 sets the variable LEFT to 1 (for the first word of LINE(1)). For FIG. 10a, RIGHT is equal to 12, because the last word of LINE(2) is word 11, and step 166 assigns the value of LSTWORDLINE(1)+1 to the variable RIGHT. This will select words 1–11 of the text object T in FIG. 10a. For FIG. 10b, RIGHT is equal to 14, because the last word number is 13. Therefore, a selection of words 1–13 is made in FIG. 10b.

EXAMPLE 3

Random Text Selection

Figure 11A:
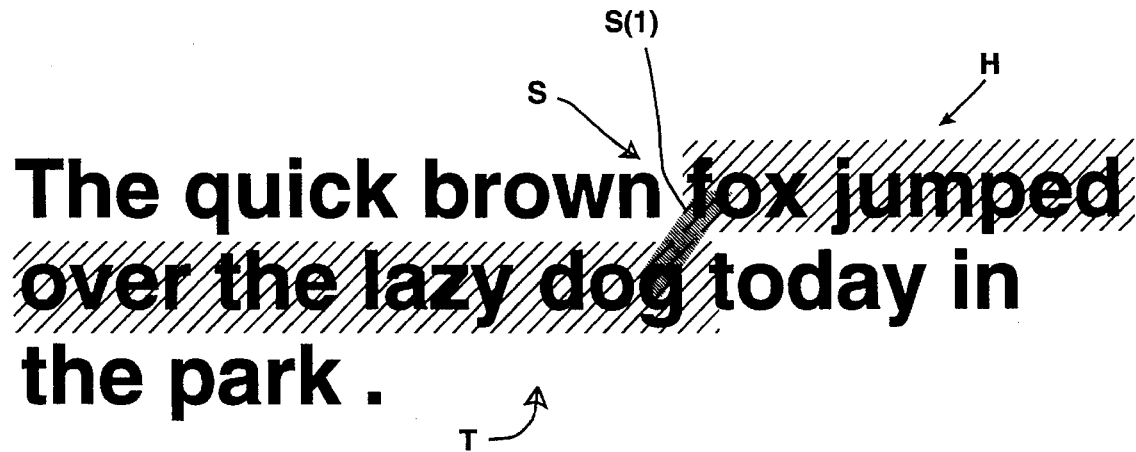
FIG. 11a illustrates a random text selection.

In FIG. 11a, and example of random selection as implemented by step 169 is illustrated. Referring to FIG. 6, the iterative loop step 130 will result in NMARK=0 because the stroke S (here comprising single segment S(1)) is not approximately colinear with a baseline of any of the lines of the text object. Therefore, the ratio NMARK and NSEG is zero, resulting in process control being turned over to step 139. In FIG. 7, it is determined that the stroke is not approximately perpendicular to the text object T by step 160, and that the stroke S is not circular by step 168. Process control is then turned over to "Process Random Select" step 169.

In FIG. 8, the iterative loop step 174 sequentially searches each word in text object T to determine the locations of the endpoints of the segments. Since the starting point of S(1) is inside of word 4 ("fox"), LEFT is assigned the value 4. Since S(NSEG), which is the same as S(1) in this example because there is only one segment, has its ending point inside of word 9, RIGHT is assigned the value of 10. This causes a selection of the text object T from word 4 to word 9, as indicated by highlight H.

EXAMPLE 4

Entire Text Object Selection

Figure 11B:
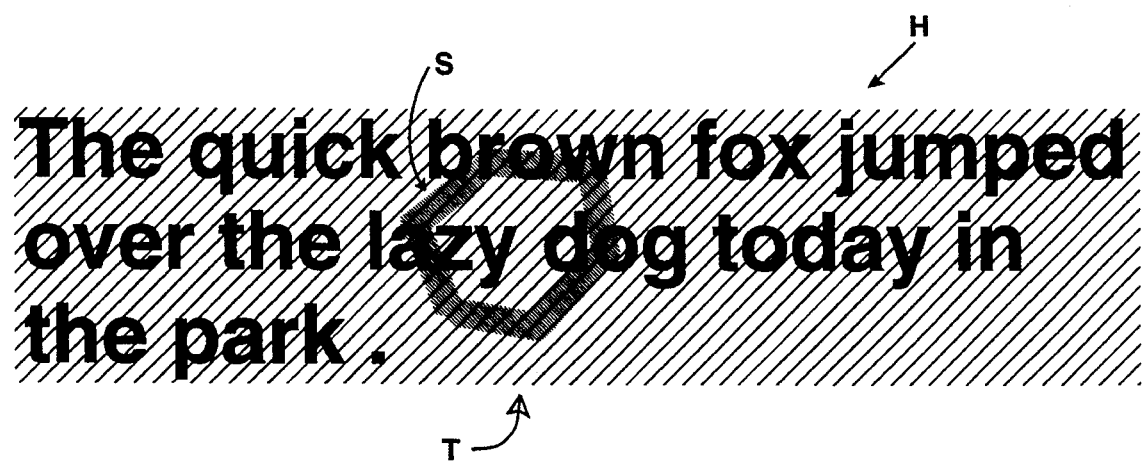
FIG. 11b illustrates the selection of an entire text object.

In FIG. 11b, the entire text object T is selected by a substantially circular stroke S. Referring to FIG. 6, the iterative loop step 130 will result in a small, at best, number NMARK in comparison to the total number of segments NSEG. Therefore, the ratio of NMARK to NSEG will be small (i.e. less than e) and the "Process General Select" step 139 will be processed. In FIG. 7, it is determined by decision step 160 that stroke S is not substantially perpendicular to the text object T and by decision step 168 that the stroke S is substantially circular. Decision step 170 then determines that the bounding box for stroke S substantially overlaps the bounding box for text object T. The variable LEFT is set to 1, and the variable RIGHT is set to 14 (since NWORD=13 and RIGHT=NWORD+1). This causes a selection of the entire text object T.

Figure 12:
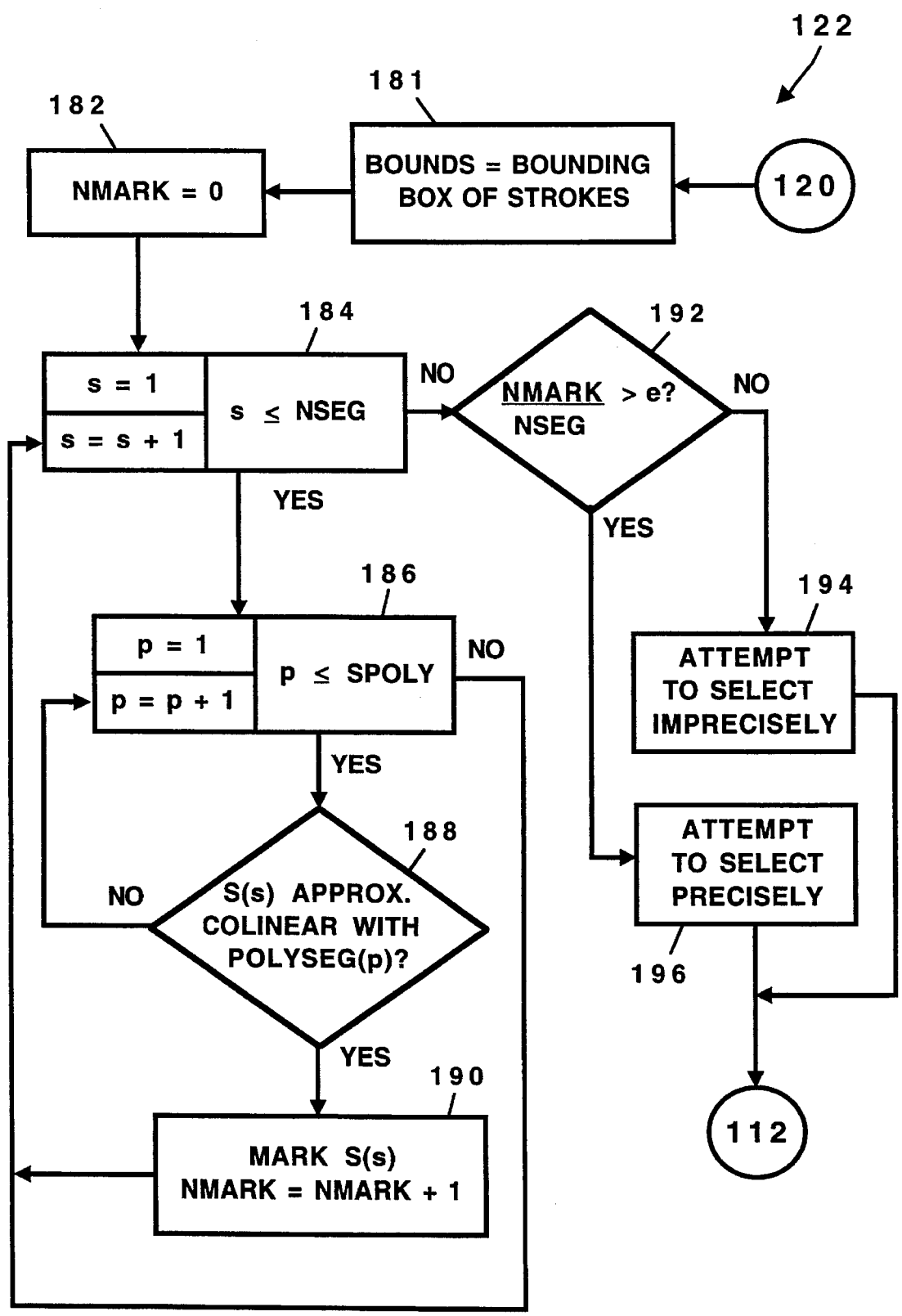
FIG. 12 is a flow diagram of a process for attempting to select a graphical object in accordance with the present invention.

In FIG. 12, step 122 "Attempt to Select Graphical Object" of FIG. 5 is shown in greater detail. In a first step 181, the parameters of the bounding box of a stroke S (again comprising one or more segments S(s)) is assigned to the variable BOUNDS. Next, in a step 182, the variable NMARK is set to zero. Iterative loop step 184 initializes a counter s to 1 and iterates the counter s in the range {1::NSEG}, where NSEG is the number of segments in stroke S. An iterative loop step 186 initializes the counter p to 1 and iterates p by 1 in the range {1::SPOLY}, where SPOLY is the number of segments in the graphical object. The number SPOLY is one of the parameters of the graphical object which can be determined by simply inspecting the graphical object. In a decision step 188, segment S(s) of a stroke S is compared with segment POLYSEG(p) of the graphical object. Again, S( ) is an array storing the NSEG segments of the stroke S, and POLYSEG is an array storing the SPOLY segments of the graphical object. If the result of the decision step 188 is that the two segments are not substantially colinear, process control is returned to iterative loop step 186. If S(s) is approximately colinear with POLYSEG(p), then segment S(s) is marked and NMARK is iterated by 1 in a step 190, and process control is returned to iterative loop step 184. As discussed previously, segment S(s) can be marked in a number of fashions, such as by setting a flag in the an array or object associated with segment S(s). Process control is also returned to iterative loop step 184 upon the completion of interative loop step 186.

Upon the completion of iterative loop step 184, the ratio of NMARK to NSEG is calculated and compared to a constant e. The purpose of step 192 is to determine the percentage of the number of segments of the stroke which are colinear with segments of the graphical object. If the ratio is high, there is a high confidence that the segments of the graphical object are being precisely selected, and if the ratio is low there is a low confidence that segments of the graphical object are being precisely selected. A typical value for e is 75%. When the ratio of NMARK to NSEG is greater than e, step 196 attempts to precisely select segments of the graphical object, after which process control is returned to step 112 of FIG. 5. When the ratio of NMARK to NSEG is less than e, step 194 attempts to imprecisely select some or all of the graphical object, after which process control is also returned to step 112 of FIG. 5.

Figure 13:
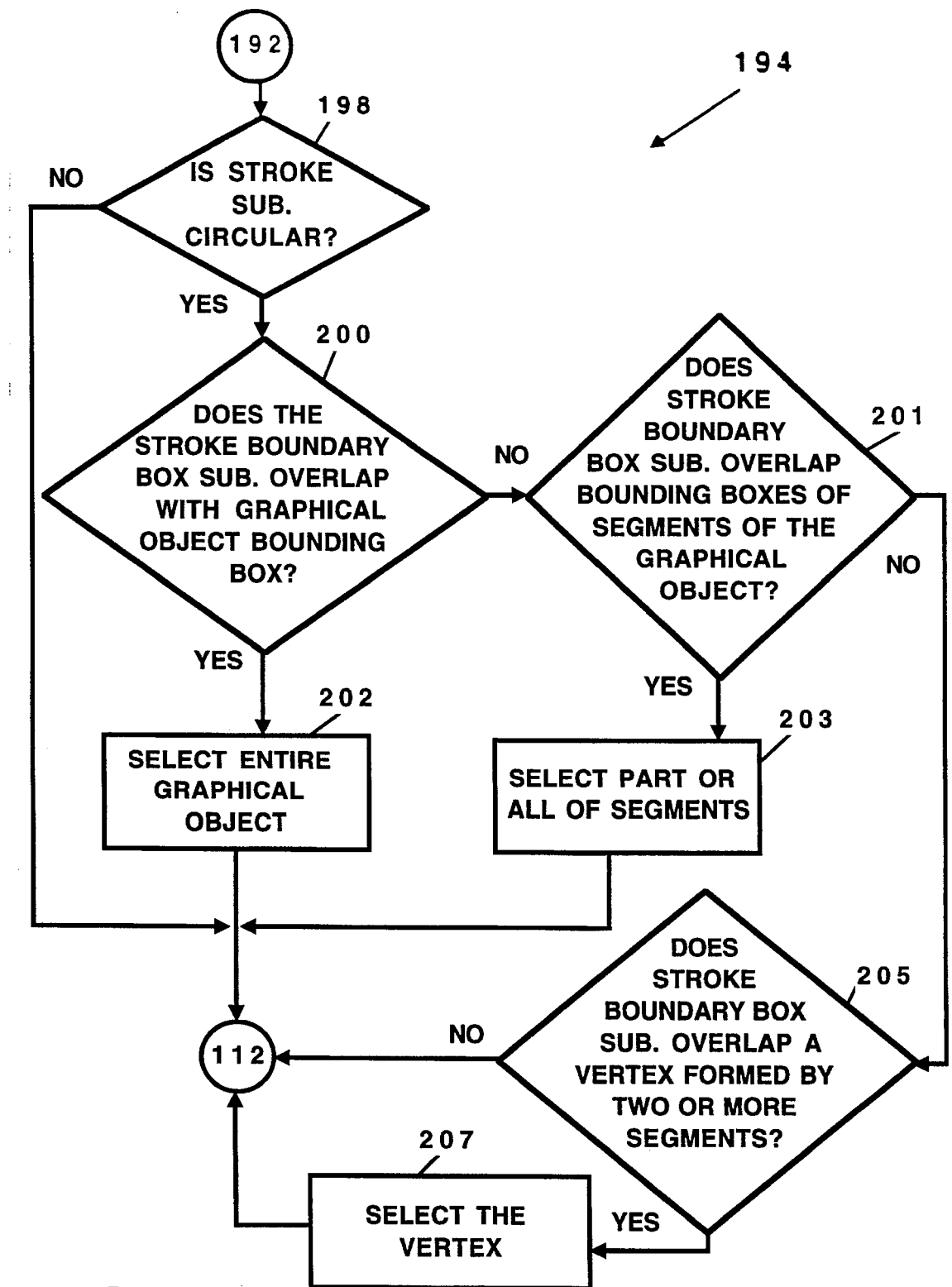
FIG. 13 is a flow diagram of a process for attempting to imprecisely select a graphical object.

In FIG. 13, the "Attempt to Select Imprecisely" step 194 of FIG. 12 is illustrated in greater detail. In a decision step 198, the stroke S is analyzed to determine if it is substantially circular. This process can be accomplished as described previously, or by other algorithms well known to those skilled in the art. If the stroke is not circular, process control is returned to step 112 of FIG. 5 without any selection of the graphical object. If the stroke is substantially circular, decision step 200 determines whether the bounding box BOUNDS of the stroke S substantially overlaps the graphical object's bounding box. This decision step 200 operates in a similar manner to step 170 of FIG. 7. If the result of the decision step 200 is that there is substantial overlap, then the entire graphical object is selected, i.e. all POLYSEG(p) of the graphical object in the range p={1::SPOLY} are highlighted. After selection of the entire graphical object, process control is returned to step 112 of FIG. 5.

If the result of decision step 200 is that BOUNDS does not substantially overlap the bounding box for the entire graphical object, a decision step 201 determines whether BOUNDS substantially overlaps one or more of the boundary boxes of the segments POLYSEG. If BOUNDS does substantially overlap one or more segment boundary boxes, part or all of those boundary boxes are selected in a step 203, after which process control is returned to step 112. A method for selecting part or all of a segment will be discussed in greater detail with reference to FIGS. 14, 15, and 16. If BOUNDS does not substantially overlap one or more segment boxes, a step 205 determines whether it overlaps a vertex formed by two or more intersecting segments. If it does, the vertex is selected in a step 207, and if it does not process control is returned to step 112. Process control is returned to step 112 after step 207.

The following are two examples of imprecise graphical selection:

EXAMPLE 5

Imprecise Selection of Entire Graphical Object

Figure 13A:
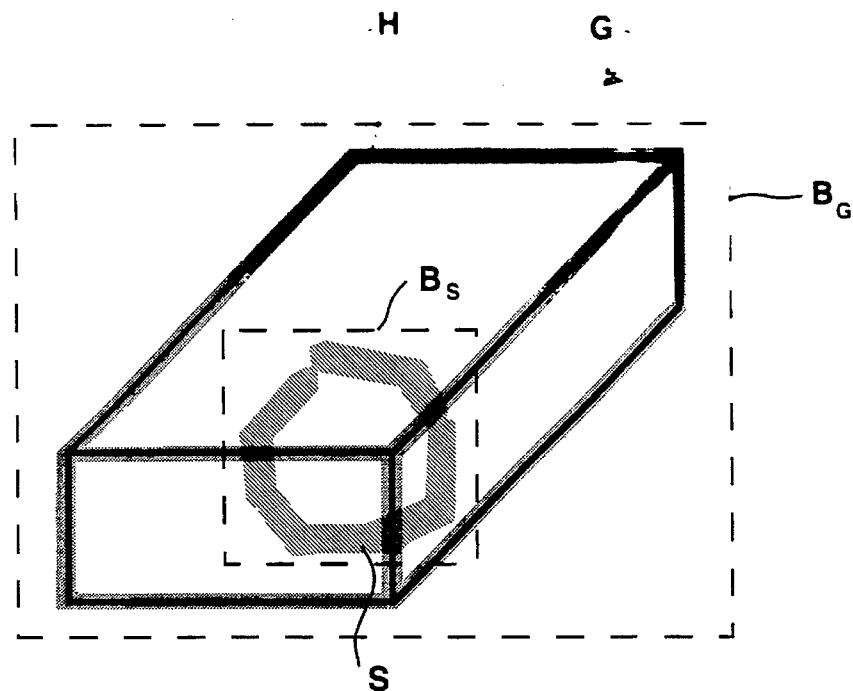
FIGS. 13a and 13b illustrate two results of imprecise selection.

In FIG. 13a, a graphical object G is comprised of a number of nine polygonal segments. Stroke S is likewise comprised of a number of stroke segments. It is determined by the iterative loop step 184 and the decision step 192 that the segments of stroke S are not well aligned with the segments of the graphical object G. Therefore, the process 122 attempts to select imprecisely by implementing process 194. In process 194, it is determined that stroke S is substantially circular as previously described. It is also determined that the boundary box $B_S$ of stroke S substantially overlaps the graphical object G boundary box $B_G$, or vice versa, in step 200. Therefore, the entire graphical object G is selected by step 202 as indicated by highlight H.

EXAMPLE 6

Imprecise Selection of Part of Graphical Object

Figure 13B:
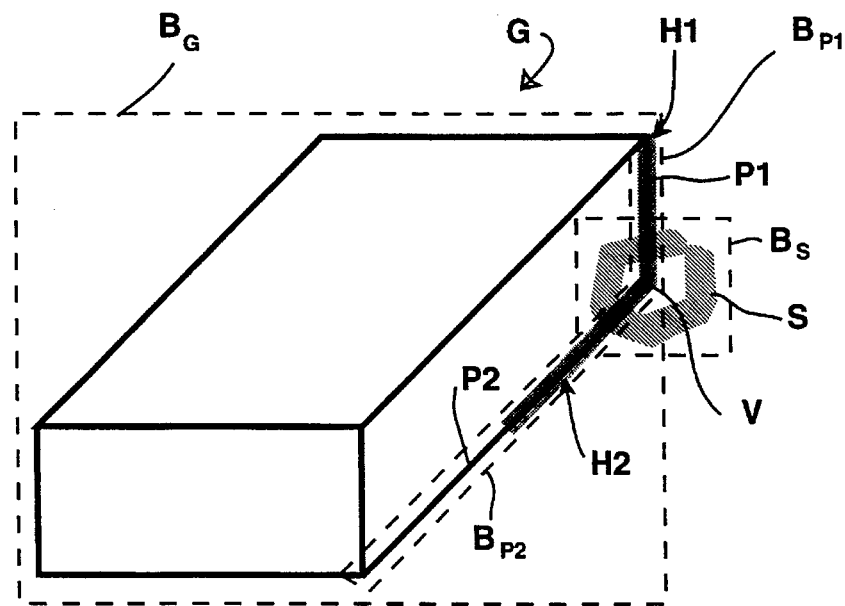

In FIG. 13b, a graphical object G is again comprised of nine polygonal segments. Stroke S is likewise comprised of a number of stroke segments. It is again determined by process 122 that process 194 should be implemented to attempt imprecise selection. Step 198 determines, as before, that the stroke S is substantially circular, but step 200 determines that the boundary box $B_S$ does not substantially overlap the boundary box $B_G$ of the graphical object G. Step 201 determines that the boundary box $B_S$ does sufficiently overlap the boundary boxes $B_{P1}$ of a segment P1 and $B_{P2}$ of a segment P2 of the graphical object G. Step 203 then fully selects segment P1 with highlight H1 because more than half of the segment P1 is overlapped by the stroke S, and partially selects segment P2 with highlight H2 because less than half of the segment P2 is overlapped by the stroke S. If the stroke S is just over the vertex between segments P1 and P2, the vertex V will instead be selected by step 207.

Figure 14:
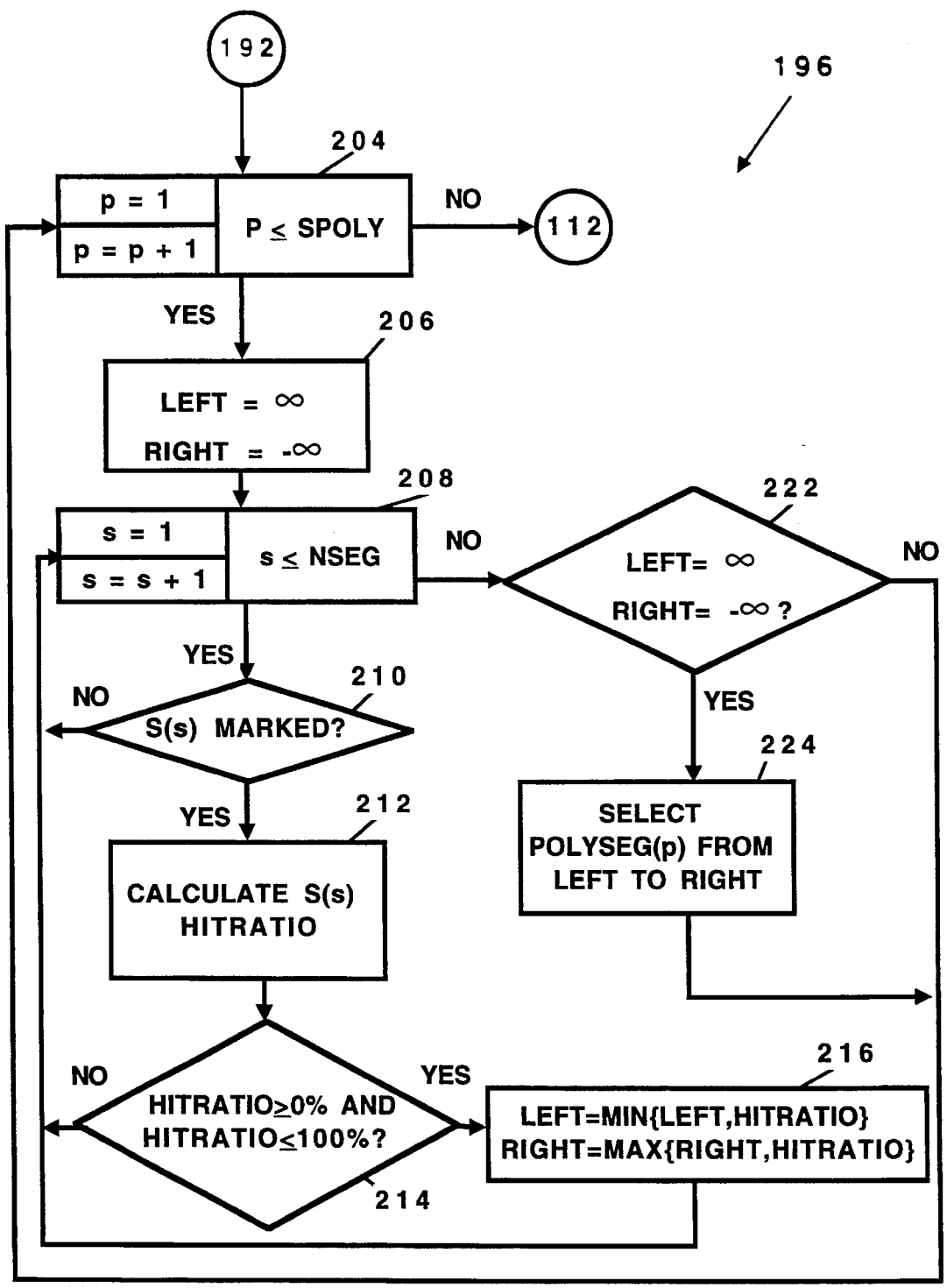
FIG. 14 is a flow diagram of a process for attempting to precisely select a graphical object.

In FIG. 14, the "Attempt to Select Precisely" step 196 of FIG. 12 is shown in greater detail. Step 196 begins with an iterative loop step 204 which initializes a counter p and iterates p by one on each pass of the loop until p≦SPOLY, where SPOLY, is the number of segments in the graphical object. In a step 206, the variables LEFT and RIGHT are set to +∞ and −∞, respectively. Next, in iterative loop step 208, a counter s is initialized to 1 and is incremented by 1 for every pass through the loop until s≦NSEG, where NSEG is the number of segments in the stroke S. In decision step 210 it is determined whether the segment S(s) has been marked by the step 190 of FIG. 12. If it has not, process control is returned to iterative loop step 208. If the segment S(s) has been marked, a "hit ratio" value HITRATIO is calculated in step 212. A method for calculating HITRATIO will be discussed with reference to FIGS. 15a–15g.

Figure 15A:
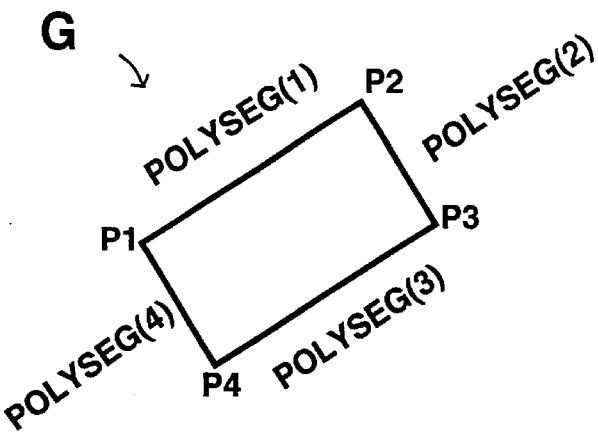
FIGS. 15a–15g illustrate precise selection of a segment of a graphical object.
Figure 15B:
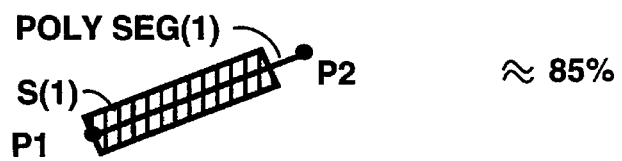
Figure 15C:
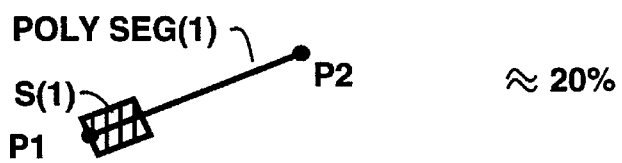
Figure 15D:
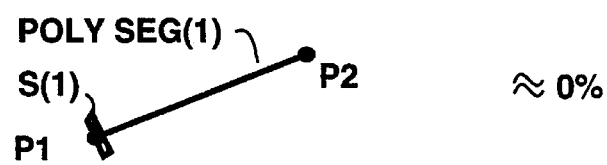
Figure 15E:
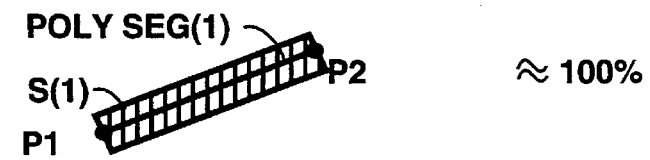
Figure 15:
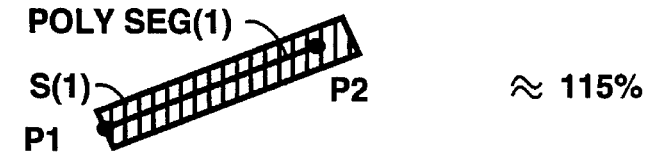
Figure 15G:
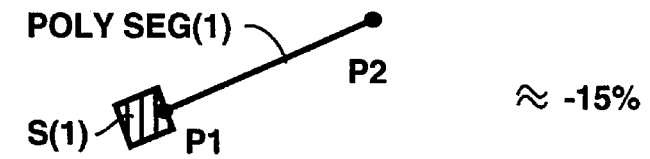

In FIG. 15a, a graphical object G includes four segments POLYSEG(1), POLYSEG(2), POLYSEG(3), and POLYSEG(4) and has four corner points P1, P2, P3, and P4. Segment POLYSEG(1) will be used for an example. In FIG. 15b, segment S(1) of stroke S coincides with about 85% of POLYSEG(1), resulting in a value of HITRATIO of 85%. In FIG. 15c, 20% of POLYSEG(1) coincides with segment S(1) resulting in a HITRATIO of 20%. In FIG. 15d, segment S(1) contacts only point P1 of POLYSEG(1) resulting in a HITRATIO of 0%. In FIG. 15e, segment S(1) of stroke S coincides completely with POLYSEG(1), resulting in a 100% HITRATIO. In FIG. 15f, segment S(1) coincides with POLYSEG(1) and overlaps the end of POLYSEG(1) resulting in a HITRATIO greater than 100%, e.g. 115%. In FIG. 15g, the segment S(1) contacts point P(1) but does not coincide with any portion of POLYSEG(1), resulting in a negative HITRATIO, e.g. −15%.

Referring again to FIG. 14, the decision step 210 then determines whether:

{HITRATIO≧0%} AND {HITRATIO≦100%}

If HITRATIO is between zero and one hundred percent, inclusive, the variables LEFT and RIGHT are assigned the following values by step 216:

LEFT=MIN {LEFT, HITRATIO}

RIGHT=MAX {RIGHT, HITRATIO} where MIN and MAX are the functions discussed previously. If HITRATIO is not between zero and one hundred percent, inclusive, process control is returned to step 208.

After the completion of iterative loop step 208, a decision step 222 determines whether the variables LEFT and RIGHT are equal to +∞ and −∞, respectively. If they are, process control returns to iterative loop step 204. If they are not, POLYSEG(p) is marked from LEFT to RIGHT. In consequence, the process 196 permits all or a portion of an individual segment of a graphical object to be selected. Process control then returns to iterative loop step 204. Upon the completion of step 204, process control returns to step 112 of FIG. 5.

Figure 16:
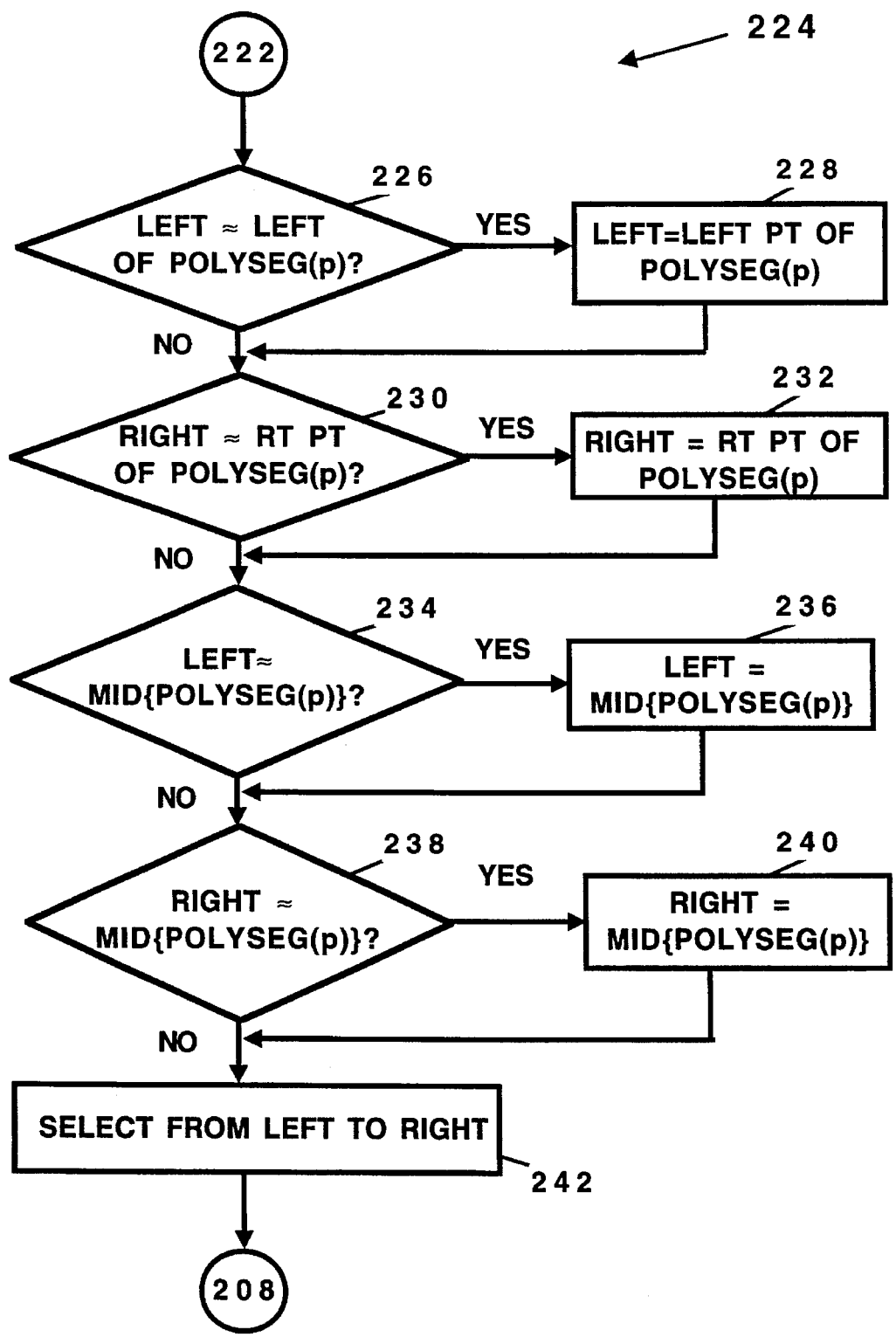
FIG. 16 is a flow diagram of a process for selecting a segment of a graphical object.

FIG. 16 illustrates a "Select" step 224 which is a preferred method for implementing step 224 of FIG. 14. In a decision step 226, LEFT is compared to the left endpoint P of POLYSEG(p) and, if they are approximately equal, LEFT is assigned the value of the left endpoint P of POLYSEG(p) in a step 228. Next, in a decision step 230, RIGHT is compared to the right endpoint P of POLYSEG(p) and, if they are approximately the same, RIGHT is assigned the value of the right endpoint P of POLYSEG(p) in a step 232. In decision step 234, LEFT is then compared with the midpoint of POLYSEG(p) and, if they are approximately equal, LEFT is assigned the value of the midpoint of POLYSEG(p) in a step 236. In decision step 238, RIGHT is compared with the midpoint of POLYSEG(p) and, if they are about the same, RIGHT is assigned the value of the midpoint of POLYSEG(p). Finally, in step 242, POLYSEG(p) is selected from LEFT to RIGHT. The process 224 therefore "snaps" the selection to an endpoint or the centerpoint of a selected segment if an endpoint of the stroke is sufficiently near to those points. This process can be extended to any reasonable number of snap points. For example, the process could snap to points at 0, 25, 50, 75, and 100% of a selected segment.

Figure 17:
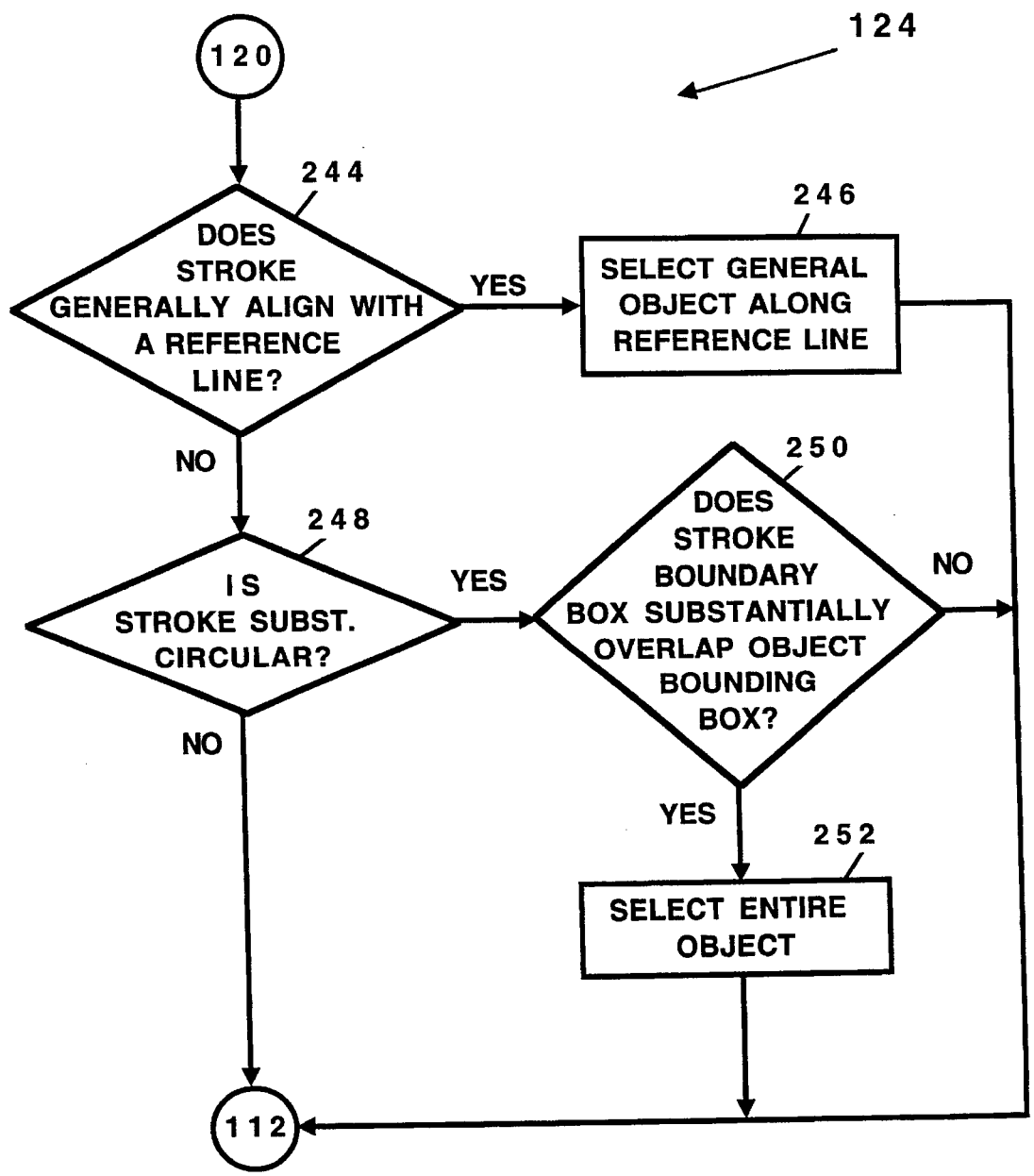
FIG. 17 is a flow diagram of a process for selecting a general object in accordance with the present invention.

Step 124 "Select General Object" of FIG. 5 will be discussed in greater detail with reference to FIG. 17. In a first step 244, the boundary box BOUNDS a stroke S is compared with reference lines provided with the general object. These reference lines are part of the parameters provided with each general object. If the stroke S does generally align with a reference line, step 246 causes the general object to be selected along the reference line. Methods for accomplishing selection along reference lines have been described previously and apply here. Process control is then returned to step 112 of FIG. 5. If the stroke S does not generally align with a reference line, decision step 248 determines whether the stroke is substantially circular. Methods for determining whether a stroke is circular have already been discussed. If the stroke is not substantially circular, process control is again returned to step 112 of FIG. 5. If it is substantially circular, decision step 250 determines whether the stroke S boundary box substantially overlaps the general object's boundary box. If it does not, process control is returned to step 112. If it does substantially overlap, the entire general object is selected in a step 252 and process control is returned to step 112. The methods previously described for detecting substantial overlap of bounding boxes and for the selection of partial and complete objects apply here as well.

An example of general selection along a reference line will be discussed with reference to FIGS. 18a and 18b. A specific example of imprecise selection of a general object will not be made, since the process is similar to the imprecise selection methods described previously.

EXAMPLE 7

Precise Selection of a General Object

Figure 18A:
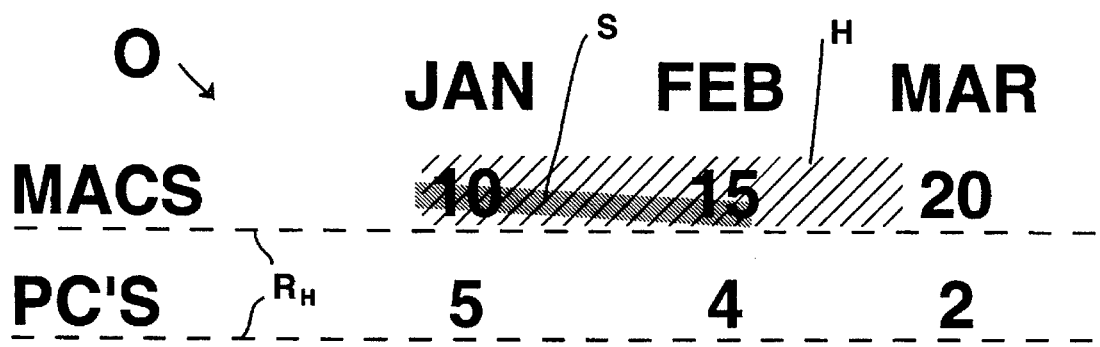
FIGS. 18a and 18b illustrate the selection of a portion of a general object.

In FIG. 18a a general object O includes a number of horizontal reference lines $R_H$. Step 244 of FIG. 17 determines that stroke S generally aligns with a reference line $R_H$. Step 246 then selects the general object along the reference line $R_H$ using the selection process described previously to create a highlight H.

Figure 18B:
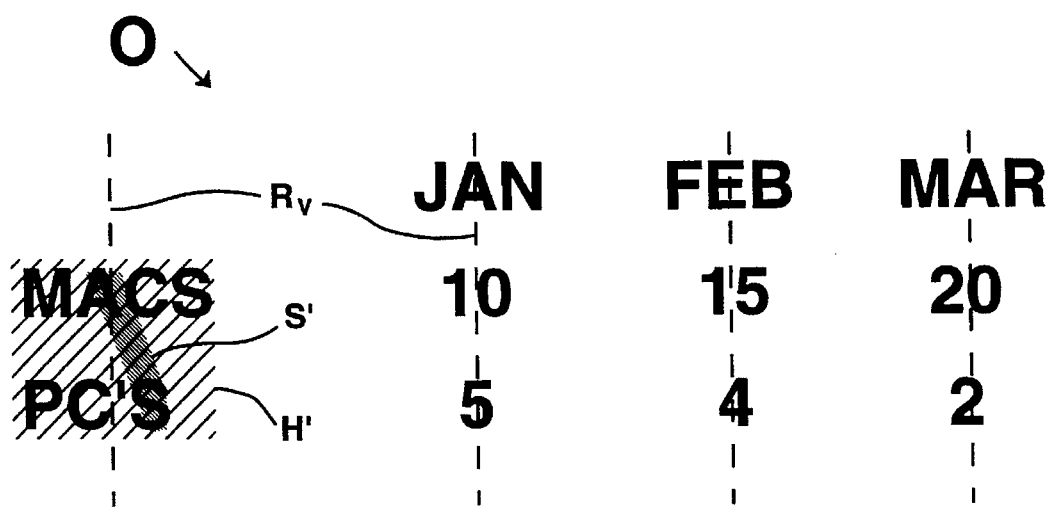

In FIG. 18b the general object O further includes a number of vertical reference lines $R_v$. Step 244 of FIG. 17 determines that a stroke S' generally aligns with one of the reference lines $R_v$. Step 246 then selects the general object O along the reference line $R_v$ to create a highlight H'.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit of the present invention. It is therefore intended that the following appended claims include all such alterations, modifications and permutations as fall within the true spirit and scope of the present invention.

What is claimed is:

1. A method of selecting one or more items on a display screen of a stylus-based computer system, the computer system providing bounding boxes surrounding the items displayed on the display screen, the computer system also providing a normal nib of activated pixels at a location where the stylus contacts the display screen, the computer system also providing a normal ink image of a path traversed by the stylus on the display screen, the width of the normal ink image corresponding to the size of the normal nib, the method comprising the following steps:

(a) automatically generating a highlight nib having a larger size than the normal nib when the stylus is held stationary on the display screen for a predetermined time period, the highlight nib capable of producing a highlight ink image which is wider than the normal ink image, the width of the highlight ink image corresponding to the size of the highlight nib;

(b) determining a highlight path traversed by the stylus on the display screen and defined by the highlight nib, the highlight path defining a highlight stroke with a surrounding bounding box;

(c) displaying the highlight stroke in a highlight ink image which has a greater width than the normal ink image;

(d) selecting one or more of the items displayed on the screen based upon, at least in part, the identity of those items which have had their bounding boxes intersected by the bounding box of the highlight stroke; and (e) highlighting the items selected on the display screen.

2. The method of claim 1 further comprising a step of producing an audible signal confirming that a highlight nib has been formed.

3. The method of claim 2 wherein the audible signal is a beep.

4. The method of claim 1 wherein the step of generating a highlight nib occurs when the stylus is held stationary for at least about 0.25 seconds.

5. The method claim 1 further comprising a step of removing the displayed highlight ink when the items selected on the display screen are highlighted in step e.

6. The method of claim 1 wherein the step of selecting one or more items involves selecting displayed items from the group consisting of text objects, graphical objects, and combinations thereof.

7. The method of claim 1 wherein the step of selecting one or more items involves selecting a single object which has had its bounding box intersected by the bounding box of the stroke.

8. The method of claim 1 wherein the step of selecting one or more items involves selecting one or more lines of text when the stroke is drawn perpendicular to and through the selected lines of text.

9. The method of claim 1 wherein the step of selecting one or more items involves selecting those items which have been surrounded by a substantially circular stroke.

10. The method of claim 1 wherein the step of selecting one or more items involves selecting those items whose bounding boxes are substantially overlapped by the bounding box of a substantially circular stroke.

11. The method of claim 1 wherein the step of selecting one or more items involves selecting a portion of an item when the bounding box of a substantially circular stroke does not substantially overlap the bounding box of the item, but does overlap the bounding box of the portion of the item.

12. The method of claim 1 wherein the step of generating a highlight nib generates a nib having a number of activated pixels that is greater than a number of activated pixels associated with the normal nib.

13. A stylus-based computer system comprising:

a cpu;

a memory;

a display screen sensitive to the position of a stylus and communicating with the cpu such that a normal nib of activated pixels is displayed at a location where the stylus contacts the display screen, the normal nib having a normal width, and a highlight nib having a larger number of activated pixels than the normal nib is automatically displayed when the stylus is held stationary on the display screen for a predetermined period, the highlight nib having a highlight width which is wider than the normal width, wherein when the highlight nib is displayed, any items displayed on the display screen which are contacted by the highlight nib are selected.

14. The stylus-based computer of claim 13 further comprising means for generating an audible signal when a highlight nib has been formed.

15. The stylus-based computer of claims 13 further comprising means for generating bounding boxes surrounding items displayed on the display screen, wherein when a bounding box is contacted by the highlight nib, an item surrounded by said bounding box is selected.

* * * * *